United States Patent
Podgorny et al.

(10) Patent No.: US 10,242,093 B2
(45) Date of Patent: Mar. 26, 2019

(54) METHOD AND SYSTEM FOR PERFORMING A PROBABILISTIC TOPIC ANALYSIS OF SEARCH QUERIES FOR A CUSTOMER SUPPORT SYSTEM

(71) Applicant: Intuit Inc., Mountain View, CA (US)

(72) Inventors: Igor A. Podgorny, San Diego, CA (US); Warren Bartolome, San Diego, CA (US); Nolan Richard Patterson, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 683 days.

(21) Appl. No.: 14/926,232

(22) Filed: Oct. 29, 2015

(65) Prior Publication Data

US 2017/0124184 A1    May 4, 2017

(51) Int. Cl.
G06F 17/30 (2006.01)
G06N 7/00 (2006.01)
G06Q 30/00 (2012.01)

(52) U.S. Cl.
CPC ....... *G06F 17/30696* (2013.01); *G06N 7/005* (2013.01); *G06Q 30/016* (2013.01)

(58) Field of Classification Search
CPC .............. G06F 17/30696; G06N 7/005; G06Q 30/016
See application file for complete search history.

(56) References Cited

U.S. PATENT DOCUMENTS

| 5,471,382 A | 11/1995 | Tallman et al. |
| 5,519,608 A | 5/1996 | Kupiec |
| 6,147,975 A | 11/2000 | Bowman-Amuah |
| 6,601,055 B1 | 7/2003 | Roberts |
| 7,013,263 B1 | 3/2006 | Isaka et al. |
| 7,222,078 B2 | 5/2007 | Abelow |
| 7,385,716 B1 | 6/2008 | Skaanning |

(Continued)

FOREIGN PATENT DOCUMENTS

| CN | 101520802 | 4/2009 |
| EP | 2159715 | 3/2010 |
| WO | WO 2011/053830 | 5/2011 |

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).

(Continued)

*Primary Examiner* — Kris E Mackes
*Assistant Examiner* — Tiffany Thuy Bui
(74) *Attorney, Agent, or Firm* — Hawley Troxell Ennis & Hawley LLP; Philip McKay

(57) ABSTRACT

A method and system uses a probabilistic topic model to identify topics that are relevant search query terms received by a customer support system from a user, according to one embodiment. The probabilistic topic model identifies topics that are relevant to the search query terms at least partially based on the context around the receipt of the search query terms, according to one embodiment. By identifying relevant topics at least partially based on the context around the receipt of the search query terms, a likelihood of inaccurately identifying a relevant topic is reduced, according to one embodiment.

18 Claims, 9 Drawing Sheets

(56) References Cited

U.S. PATENT DOCUMENTS

| | | |
|---|---|---|
| 7,594,176 B1 | 9/2009 | English |
| 7,685,144 B1 | 3/2010 | Katragadda |
| 7,974,860 B1 | 7/2011 | Travis |
| 8,200,527 B1 | 6/2012 | Thompson et al. |
| 8,341,167 B1 | 12/2012 | Podgorny et al. |
| 8,645,298 B2* | 2/2014 | Hennig .............. G06N 7/005 |
| | | 706/12 |
| 8,943,145 B1 | 1/2015 | Peters et al. |
| 8,983,977 B2 | 3/2015 | Ishikawa et al. |
| 9,015,031 B2 | 4/2015 | Ferrucci et al. |
| 9,063,983 B1 | 6/2015 | Lee |
| 9,336,211 B1 | 5/2016 | Bousquet et al. |
| 9,342,608 B2 | 5/2016 | Cook et al. |
| 9,460,191 B1* | 10/2016 | Gaucher ........... G06F 17/30601 |
| 9,582,757 B1 | 2/2017 | Holmes et al. |
| 9,633,309 B2 | 4/2017 | Giffels et al. |
| 9,887,887 B2* | 2/2018 | Hunter .................. H04W 4/21 |
| 9,892,367 B2* | 2/2018 | Guo .................... G06N 99/005 |
| 9,910,886 B2 | 3/2018 | Adams, Jr. et al. |
| 2002/0111888 A1* | 8/2002 | Stanley ................ G06Q 40/02 |
| | | 705/31 |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0099924 A1 | 5/2003 | Tsuboi et al. |
| 2004/0024739 A1 | 2/2004 | Copperman et al. |
| 2005/0114327 A1 | 5/2005 | Kumamoto et al. |
| 2006/0265232 A1 | 11/2006 | Katariya et al. |
| 2007/0011131 A1 | 1/2007 | Delefevre |
| 2007/0219863 A1 | 9/2007 | Park et al. |
| 2007/0259325 A1* | 11/2007 | Clapper ................ G09B 5/14 |
| | | 434/350 |
| 2008/0189197 A1* | 8/2008 | Allanson ............ G06Q 40/02 |
| | | 705/31 |
| 2008/0215541 A1 | 9/2008 | Li et al. |
| 2008/0294637 A1 | 11/2008 | Liu |
| 2009/0012926 A1 | 1/2009 | Ishikawa et al. |
| 2009/0119575 A1 | 5/2009 | Velusamy |
| 2009/0162824 A1 | 6/2009 | Heck |
| 2009/0248659 A1 | 10/2009 | McCool et al. |
| 2009/0253112 A1 | 10/2009 | Cao et al. |
| 2009/0265340 A1 | 10/2009 | Barcklay et al. |
| 2010/0068687 A1 | 3/2010 | Bertelsen |
| 2010/0070554 A1 | 3/2010 | Richardson et al. |
| 2010/0076998 A1 | 3/2010 | Podgorny et al. |
| 2010/0088262 A1 | 4/2010 | Visel et al. |
| 2010/0185630 A1 | 7/2010 | Cheng et al. |
| 2010/0191686 A1* | 7/2010 | Wang ............... G06F 17/30634 |
| | | 706/46 |
| 2010/0203492 A1 | 8/2010 | Nibe et al. |
| 2010/0205550 A1 | 8/2010 | Chen et al. |
| 2010/0235361 A1 | 9/2010 | Chandran et al. |
| 2010/0318919 A1 | 12/2010 | Murphy et al. |
| 2011/0055699 A1 | 3/2011 | Li et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0264569 A1 | 10/2011 | Houseworth et al. |
| 2011/0282892 A1 | 11/2011 | Castellani et al. |
| 2012/0005148 A1 | 1/2012 | Horvitz et al. |
| 2012/0005219 A1 | 1/2012 | Apacible et al. |
| 2012/0022983 A1* | 1/2012 | Hughes, Jr. ............ G06Q 40/02 |
| | | 705/31 |
| 2012/0084185 A1* | 4/2012 | Ciaramitaro ......... G06Q 40/123 |
| | | 705/31 |
| 2012/0084293 A1 | 4/2012 | Brown et al. |
| 2012/0130910 A1 | 5/2012 | Al-Alami |
| 2012/0130978 A1 | 5/2012 | Li et al. |
| 2012/0136764 A1* | 5/2012 | Miller ................ G06Q 40/123 |
| | | 705/31 |
| 2012/0166438 A1 | 6/2012 | Wu et al. |
| 2012/0219142 A1 | 8/2012 | Gould |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0054497 A1 | 2/2013 | Garland et al. |
| 2013/0066693 A1 | 3/2013 | Laird-McConnell et al. |
| 2013/0073390 A1 | 3/2013 | Konig et al. |
| 2013/0117677 A1* | 5/2013 | St. Jacques, Jr. ......... G06F 3/00 |
| | | 715/738 |
| 2013/0282363 A1 | 10/2013 | Fan et al. |
| 2013/0297553 A1 | 11/2013 | Bierner |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0088944 A1 | 3/2014 | Natarajan et al. |
| 2014/0119531 A1 | 5/2014 | Tuchman et al. |
| 2014/0172883 A1 | 6/2014 | Clark et al. |
| 2014/0189829 A1 | 7/2014 | McLachlan et al. |
| 2014/0201045 A1 | 7/2014 | Pai et al. |
| 2014/0222669 A1 | 8/2014 | Novak et al. |
| 2014/0280070 A1* | 9/2014 | George ............. G06F 17/30719 |
| | | 707/722 |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0052087 A1 | 2/2015 | Srinivasan et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0254785 A1 | 9/2015 | Yang |
| 2015/0324805 A1 | 11/2015 | Skiba et al. |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0103833 A1 | 4/2016 | Sanders et al. |
| 2016/0148321 A1 | 5/2016 | Ciaramitaro et al. |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0124184 A1 | 5/2017 | Podgorny et al. |
| 2017/0270159 A1 | 9/2017 | Wang et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1* | 4/2018 | George ............. G06F 17/30719 |

OTHER PUBLICATIONS

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33$^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

(56) References Cited

OTHER PUBLICATIONS

Dror, et al., "From Query to Question in One Click: Suggesting Synthetic Questions to Searchers," International World Wide Web Conferences Steering Committee, May 13, 2013, pp. 391-401.

* cited by examiner

METHOD AND SYSTEM FOR PERFORMING A PROBABILISTIC TOPIC ANALYSIS OF SEARCH QUERIES FOR A CUSTOMER SUPPORT SYSTEM

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor customer support systems to complement their distributions of software system. However, traditional implementations of customer support systems fail to measure up to the expectations of many users. For some yet-to-be-discovered reason, many users expect the customer support system to understand what the user is thinking. That is, the user expects to be able to enter an extraordinarily short and poorly worded question or search query, while fully expecting the customer support system to correctly identify and/or accurately provide a response for the user. Truly, users appear to expect the customer support systems to act as mind readers.

Although science is quickly advancing, as far as the public is aware, mind reading is yet an impossible task. However, if the under-articulated, overly-concise, and/or poorly worded questions of users are met with unsatisfactory answers, the users communicate dissatisfaction by, for example, using competitors' software systems, providing negative reviews in forums, and/or avoiding other products that are available from the service provider.

What is needed is a method and system for personalizing a user experience in a customer support system by improving topic identification of search query terms in a customer support system, at least partially based on contextual information related to the search query terms, to improve the likelihood of customer satisfaction with the customer support system.

SUMMARY

Embodiments of the present disclosure address some of the shortcomings associated with traditional customer support systems by improving topic identification of search query terms in a customer support system by using contextual information to reduce a likelihood of inaccuracy in a probabilistic topic model, and to improve the likelihood of customer satisfaction with the customer support system, according to one embodiment. By reducing the likelihood of inaccuracy of a probabilistic topic model, a customer support system improves the likelihood of user satisfaction and assists the service provider in achieving business objectives such as, but not limited to, converting potential customers into paying customers and attracting potential customers to products offered by the service provider, according to one embodiment.

The Inventors have determined that a probabilistic topic model gradually performs more accurately as a character length or a word length of search query terms increases (up to a certain point). Entropy of a probabilistic topic model represents lack of predictability, lack of order, or likelihood of inaccuracy of the probabilistic topic model. Therefore, a character length or word length of search query terms that exceed a predetermined threshold (e.g., 100 characters) is likely to provide a particular level of accuracy in identifying a topic that is relevant to the search query terms. A longer character length generally correlates with additional searchable terms that help increase the topic relevance score of one topic over other topics. In other words, a longer character length of search query terms can increase the likelihood or probability that one particular topic is more relevant to the user's search query terms than other topics. Because getting a user to add more details to a question can be a fruitless endeavor, embodiments of the disclosed customer support system use the context by which the search query terms are received to decrease the likelihood of associating the wrong topic with the search query terms, which could result in providing an inaccurate/irrelevant response to the user's submission. The context by which the search query terms are received is herein referred to as context characteristics, e.g., user characteristics, user experience display ID, product ID, and the like. The context characteristics are added to or used by the probabilistic topic model to determine which topic is relevant (or more relevant than other topics) to the search query terms. Adding the context characteristics increase the likelihood of correctly identifying a topic based on the search query terms, with an effect that is similar to (or possibly better than) having a user enter additional relevant terms to the user's search query terms, according to one embodiment. Incorporating context characteristics into the determination/identification of topics that are relevant to the user's search query terms enables the customer support system to factor in the likelihood that the subject matter the user is viewing, the user's characteristics, and/or the product the user is using can promote, induce, or contribute to questions that may arise for a particular user. Accordingly, embodiments of the disclosed customer support system use a probabilistic topics model to determine a topic that is relevant to a user's search query terms by using both the search query terms and the context characteristics surrounding or associated with those search query terms.

Probabilistic topic algorithms/models extract hidden topics or summaries from content objects (e.g., database entries, webpages, and documents), without requiring the training of the model with known (e.g., manually verified) data sets, according to one embodiment. As used herein, probabilistic topic models are configured to perform unsupervised learning by discovering/finding hidden structure in unlabeled data, without an error or reward signal to evaluate a potential solution, according to one embodiment. The customer support system uses a probabilistic topic model to determine which one of multiple topics is relevant, highly-relevant, and/or most-relevant to the search query terms entered into the question and answer customer support system by the user. In one embodiment, the probabilistic topic model uses or is trained with a Latent Dirichlet allocation ("LDA") algorithm.

These and other embodiments are disclosed in more detail below.

Using the disclosed embodiments of a method and system for improving topic identification of search query terms in a customer support system by using contextual information to reduce a likelihood of inaccuracy in a probabilistic topic model, and to improve the likelihood of customer satisfaction with the customer support system provides more accurate responses to user queries, even with search query terms that are too short or overly concise for a probabilistic topic model to function effectively. Therefore, the disclosed embodiments provide a technical solution to the long standing technical problem of how to improve the accuracy of interpreting user search query terms that are too short/brief.

The result is a much more responsive and accurate method and system for applying probabilistic topic models to content to respond to user search query terms (e.g., questions) in a customer support system. This, in turn, results in: less human and processor resources being dedicated to processing redundant customer support requests because the primary requests received inaccurate responses; less memory and storage bandwidth being dedicated to buffering and storing complaints for poorly-worded responses to customer questions; and less communication bandwidth being utilized by inaccurate responses to overly concise search query terms.

The disclosed method and system for improving topic identification of search query terms in a customer support system by using contextual information to reduce a likelihood of inaccuracy in a probabilistic topic model, and to improve the likelihood of customer satisfaction with the customer support system does not encompass, embody, or preclude other forms of innovation in the area of user experience personalization. In addition, the disclosed method and system for improving topic identification of search query terms in a customer support system by using contextual information to reduce a likelihood of inaccuracy in a probabilistic topic model, and to improve the likelihood of customer satisfaction with the customer support system is not related to any fundamental economic practice, fundamental data processing practice, mental steps, or pen and paper based solutions, and is, in fact, directed to the relatively new problem of improving topic identification of search query terms in a customer support system. Consequently, the disclosed method and system for improving topic identification of search query terms in a customer support system by using contextual information to reduce a likelihood of inaccuracy in a probabilistic topic model, and to improve the likelihood of customer satisfaction with the customer support system is not directed to, does not encompass, and is not merely, an abstract idea or concept.

In addition, the disclosed method and system for improving topic identification of search query terms in a customer support system by using contextual information to reduce a likelihood of inaccuracy in a probabilistic topic model, and to improve the likelihood of customer satisfaction with the customer support system provides for significant improvements to the technical fields of user experience, electronic transaction data processing, financial transaction processing, electronic tax return preparation, customer support systems, data processing, and data management.

In addition, as discussed above, the disclosed method and system for improving topic identification of search query terms in a customer support system by using contextual information to reduce a likelihood of inaccuracy in a probabilistic topic model, and to improve the likelihood of customer satisfaction with the customer support system more accurately identifies the needs of a user, which results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for improving topic identification of search query terms in a customer support system by using contextual information to reduce a likelihood of inaccuracy in a probabilistic topic model, and to improve the likelihood of customer satisfaction with the customer support system.

Figure 1:
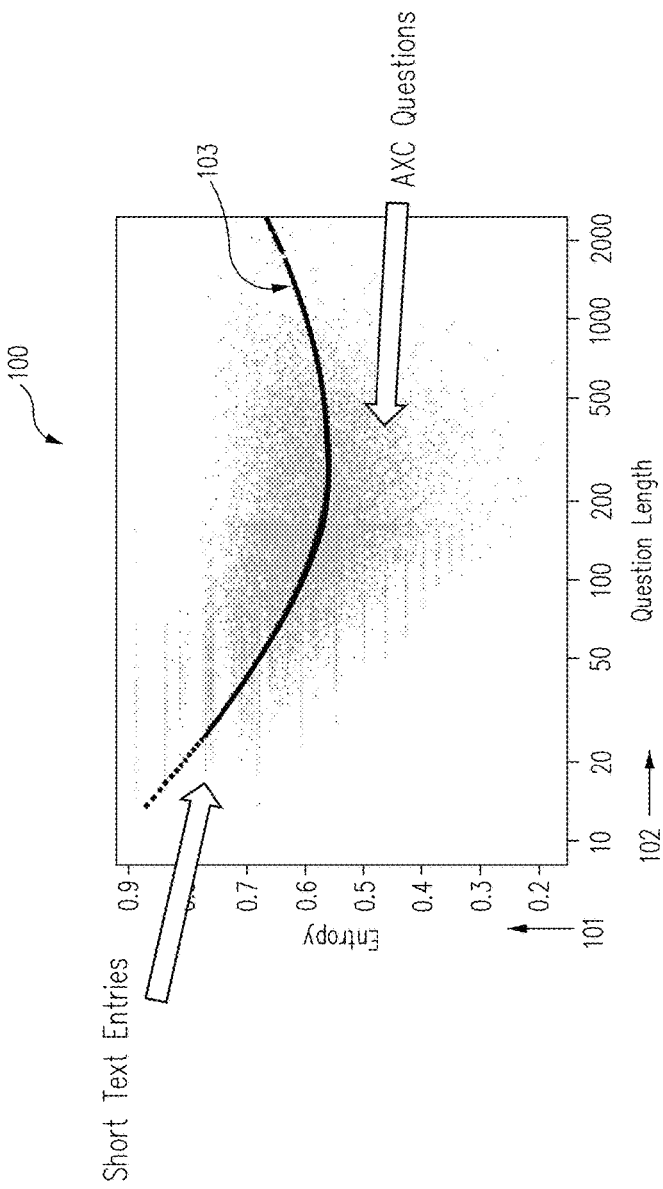
FIG. 1 is a graph of average entropy across various question lengths for a probabilistic model, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

TERM DEFINITIONS

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for determining a level of popularity of submission content, prior to publicizing the submission content with a question and answer support system as described herein, and/or a person and/or entity that interfaces with, and/or to whom information is provided by, the method and system for determining a level of popularity of submission content, prior to publicizing the submission content with a question and answer support system as described herein, and/or a legal guardian of person and/or entity that interfaces with, and/or to whom information is provided by, the method and system for determining a level of popularity of submission content, prior to publicizing the submission content with a question and answer support system as described herein, and/or an authorized agent of any party and/or person and/or entity that interfaces with, and/or to whom information is provided by, the method and system for determining a level of popularity of submission content, prior to publicizing the submission content with a question and answer support system as described herein. For instance, in various embodiments, a user can be, but is not limited to, a person, a commercial entity, an application, a service, and/or a computing system.

As used herein, a question includes search query terms, which are the searchable terms of the question and includes question words, which identify the question as a question (e.g., why, how, what, when, which, where, can, etc.). The question can also include a question word, such as why, when, how, where, can, etc. Some search engines and analytics models distinguish between question words and other terms within a question or text stream, so search question words are used herein to represent a special subset of search query terms. Although, question words may also be referenced and claimed herein as being independent of other search query terms. Search query terms may be entered into a customer support system without necessarily forming a question, so a question includes search query terms, but search query terms may not be necessarily for a question per se.

As used herein, the term "probabilistic topic model" or "probabilistic model" denotes one or more individual or combined algorithms or sets of equations that describe, determine, or predict characteristics of or the performance of a datum, a data set, multiple data sets, data objects, a computing system, and/or multiple computing system. The probabilistic topic model includes algorithms configured to discover the topics or hidden thematic (or semantic) structure in text, large data objects, and archives of documents.

As used herein, the term "context characteristics" is interchangeable with the term "context information", which denote the context by which the search query terms are received. The context characteristics include, but are not limited to, user characteristics of the user who provides the search query terms, user experience display identifier for user experience displays viewed by the user, product identifier for the software system(s) used by the user, clickstream data for the user, browsing history for the user, and the like.

THEORY AND EMPIRICAL ANALYSIS

FIG. 1 illustrates an example of a graph 100 of the entropy of a probabilistic topic model, as the entropy relates to the length of a question received in a customer support system. The probabilistic topic model used for generating the data points of the graph 100 is a Latent Dirichlet allocation ("LDA") model which discovers topics in bodies of text, without prior knowledge of the content of the text. The entropy represents lack of predictability, lack of order, or likelihood of inaccuracy of the probabilistic topic model. The graph 100 includes a y-axis 101 for entropy and an x-axis 102 for the question length. Because a question includes a number of search query terms, the x-axis can also represent the character length or a word length of search query terms, according to one embodiment. The graph 100 includes plots of thousands of questions that were received from a customer support system. The graph 100 includes an equation 104 that defines a mathematical expression of entropy and which shows that entropy is normalized and varies from 0.0 to 1.0.

The entropy, in practice, represents the likelihood of inaccuracy in identifying a topic that is relevant to the question. The curve 103 is the average entropy and shows that the minimum average entropy occurs approximately between question lengths of approximately 200-500 characters. The graph 100 also shows that for question lengths that are less than 100 characters, the entropy goes above 0.6, and the entropy exceeds 0.6 when more than approximately 1500 characters are used in the question. Because increases in entropy are representative of increases in the likelihood of inaccuracy for a probabilistic topic model, higher entropy is generally less desirable. When the question length falls below 20 characters, the entropy increases to 0.8 and above, indicating a high likelihood of inaccuracy.

The arrow labeled "short text entries" represents questions that have very short character lengths. Some users who write very short questions, do so because they themselves may not fully grasp what they want to ask. Unfortunately, because probabilistic topic models and search engines may actually be less accurate responding to shorter questions than longer ones, the users who present very short questions are likely to be confused and/or disappointed with a response to their question. By contrast, the arrow labeled "AXC questions" is representative of tax-related questions and product related questions, which are typically longer than search queries irrespective of topic.

Embodiments of the disclosed method and system for improving topic identification of search query terms in a customer support system, by using context of the search query terms can be beneficial because it can provide additional information for the probabilistic topic model to process, which effectively increases the question length, decreases the entropy, and decreases the likelihood of inaccurately identifying a relevant topic for the search query terms.

Figure 2:
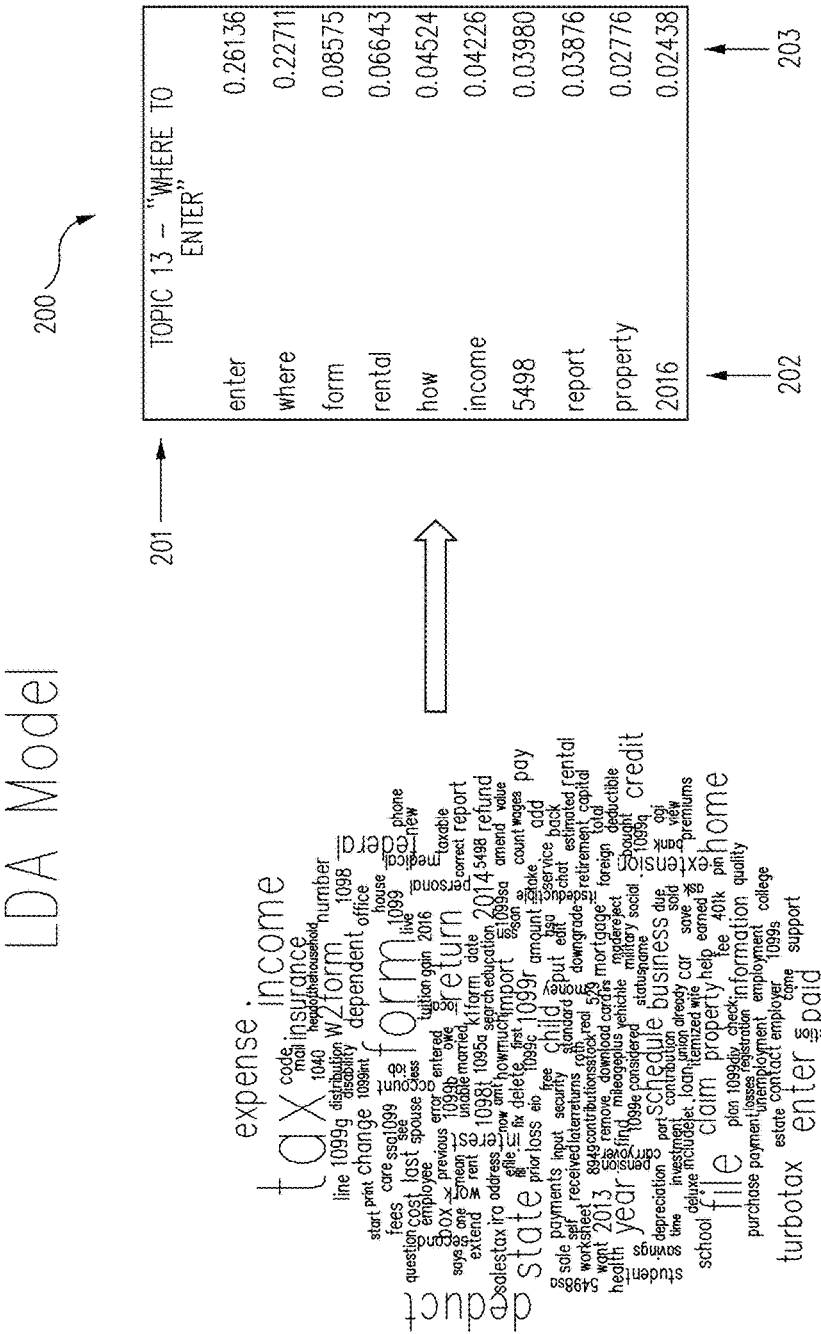
FIG. 2 is a table of topic information created with a Latent Dirichlet allocation model, in accordance with one embodiment.

FIG. 2 illustrates a table 200 that is used by a Latent Dirichlet allocation model and that can be produced by applying a Latent Dirichlet allocation algorithm to a body of text to identify a topic 201, topic terms 202, and topic term probabilities 203. Search query terms that are entered by a user are compared to the topic terms 202 to associate topic term probabilities associated with the search query terms. The topic term probabilities are combined or added to quantify a relevance of the topic 201 to the search query terms.

Figure 3:
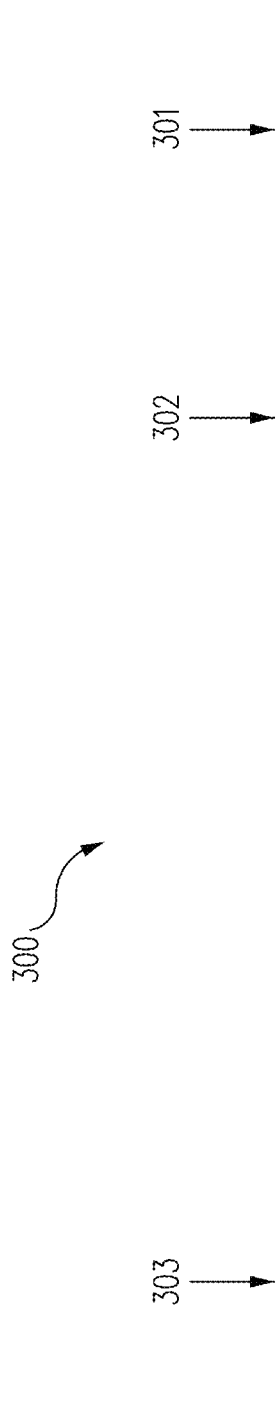
FIG. 3 is a table that illustrates changes in average entropy based on question lengths, in accordance with one embodiment.

FIG. 3 illustrates a table 300 which shows an average entropy 301 of a probabilistic topic model based on query length 302, for a number of different types of customer support systems 303. As shown, the query lengths that average less than 30 characters have an average entropy that is above 0.715. The query lengths that average 39 characters have an average entropy that is approximately 0.689. The query lengths that average 70 characters have an average entropy that is approximately 0.640.

Figure 4:
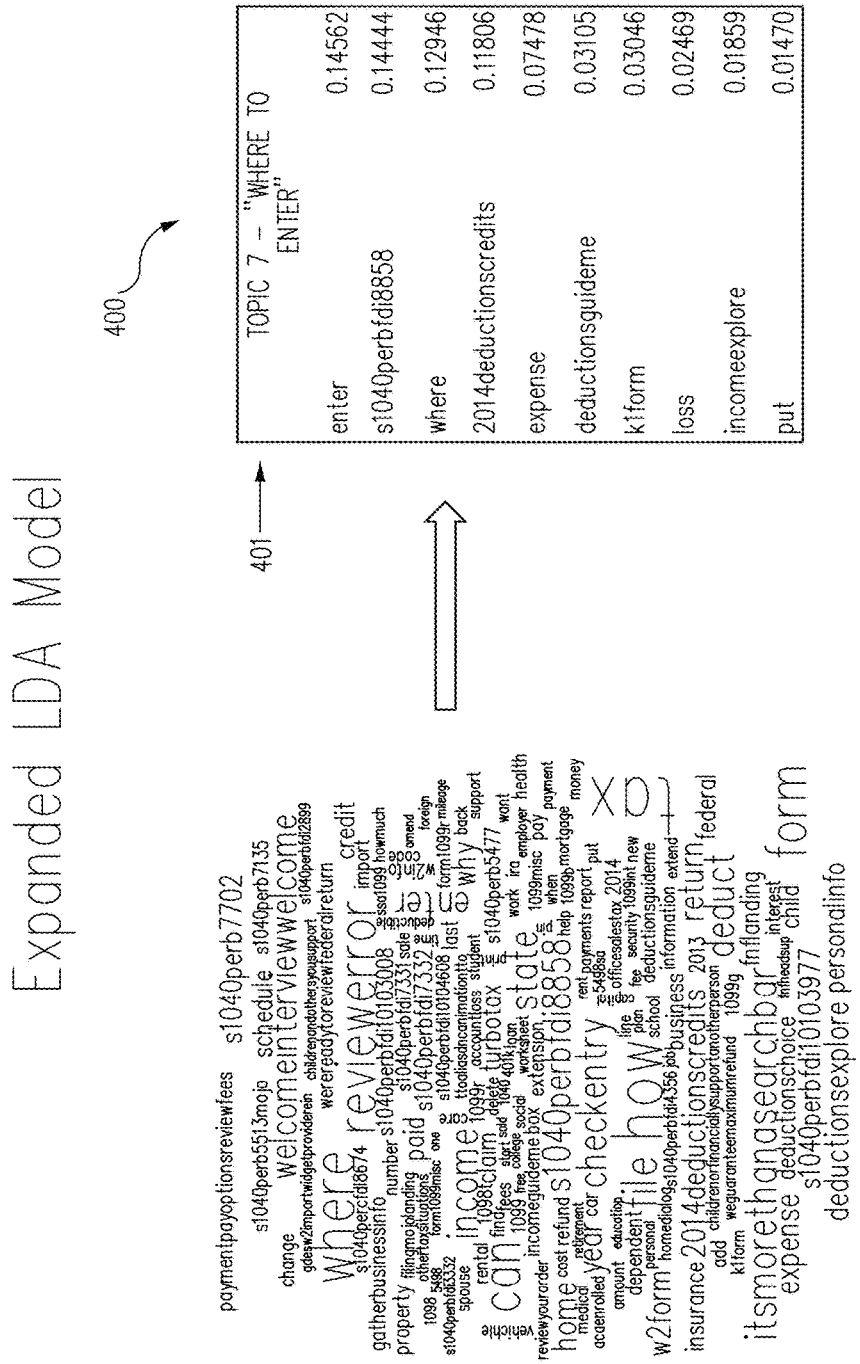
FIG. 4 is a table of topic information created with an expanded version of a Latent Dirichlet allocation model, in accordance with one embodiment.

FIG. 4 illustrates a table 400 that is used by an Expanded Latent Dirichlet allocation ("LDA") model and that can be produced by applying a Latent Dirichlet allocation algorithm to a body of text and to context characteristics (e.g., user experience displays/webpages viewed by a user) to probabilistically identify a topic 401 that is likely to be relevant to search query terms. The table 400 represents applying a probabilistic weight to context characteristics to enable a customer support system to factor in the context by which search query terms are received, when identifying a topic that is relevant to the search query terms. The table 400 includes several examples of user experience display identifiers that represent user experience displays that may be visited by a user. The table 400 also includes probabilities that are associated with the experience display identifiers. By using a table that is similar to the table 400, a customer support system may add certainty to the identification of a likely relevant topic by factoring the weight of the user experience displays visited by the user before or while the user enters search query terms into the customer support system for evaluation.

Figure 5:
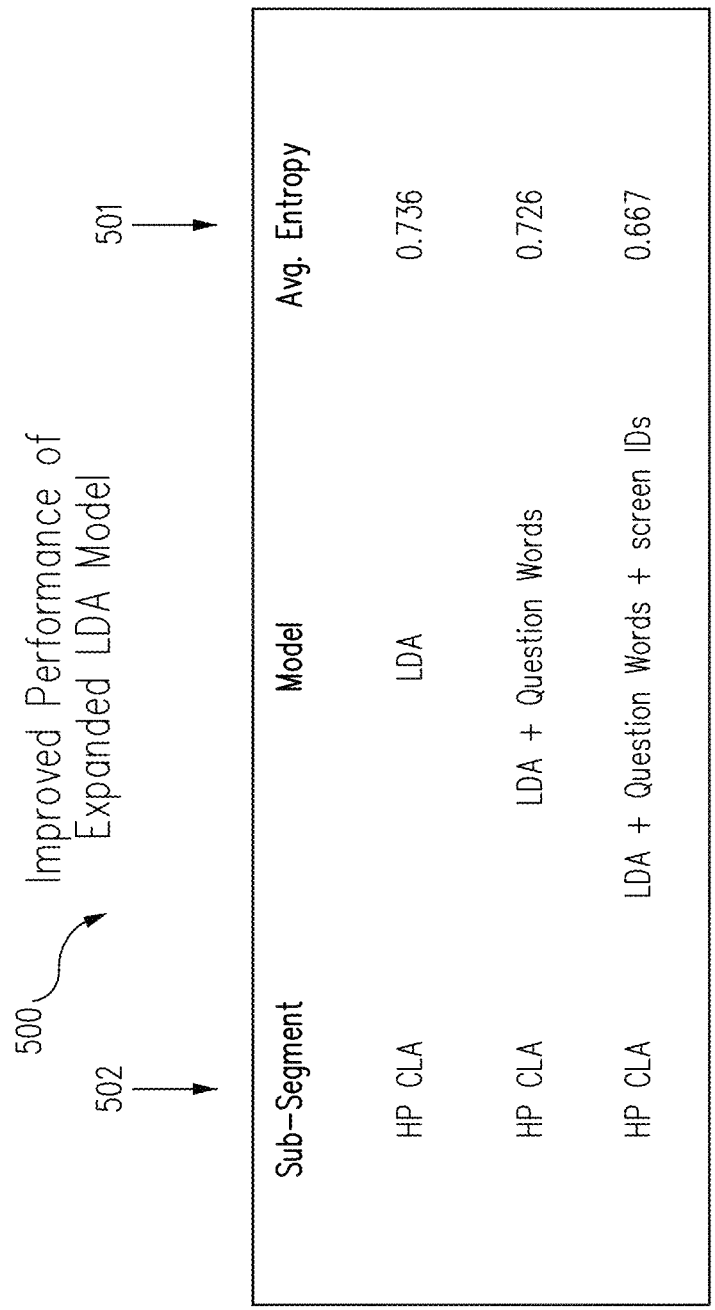
FIG. 5 is a table that illustrates changes in average entropy using an expanded version of a Latent Dirichlet allocation model, in accordance with one embodiment.

FIG. 5 illustrates a table 500 that compares average entropy 501 for a customer support system 502 across variations of probabilistic topic models (e.g., variations of LDA models). The first row illustrates an average entropy of 0.736 for relevant topics that were identified using LDA model that only evaluated search query terms. The second row illustrates an average entropy of 0.726 for relevant topics that were identified using LDA model that only evaluated search query terms and question words (e.g., how, where, when, why, can). The third row illustrates an average entropy of 0.667 for relevant topics that were identified using LDA model that evaluated search query terms, question words, and screen IDs (user experience display identifiers). Notably, by adding screen IDs (which are one embodiment of context characteristics), the entropy is reduced from 0.726 to 0.667, which is a decrease in average entropy of 8%. As discussed below, while screen IDs, i.e., user experience display identifiers, are one type of context characteristic that can be incorporated into a probabilistic topic model, other context characteristics are disclosed herein that can provide further reduction/improvement of the average entropy for search query terms received by the disclosed customer support system, according to one embodiment.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Figure 6:
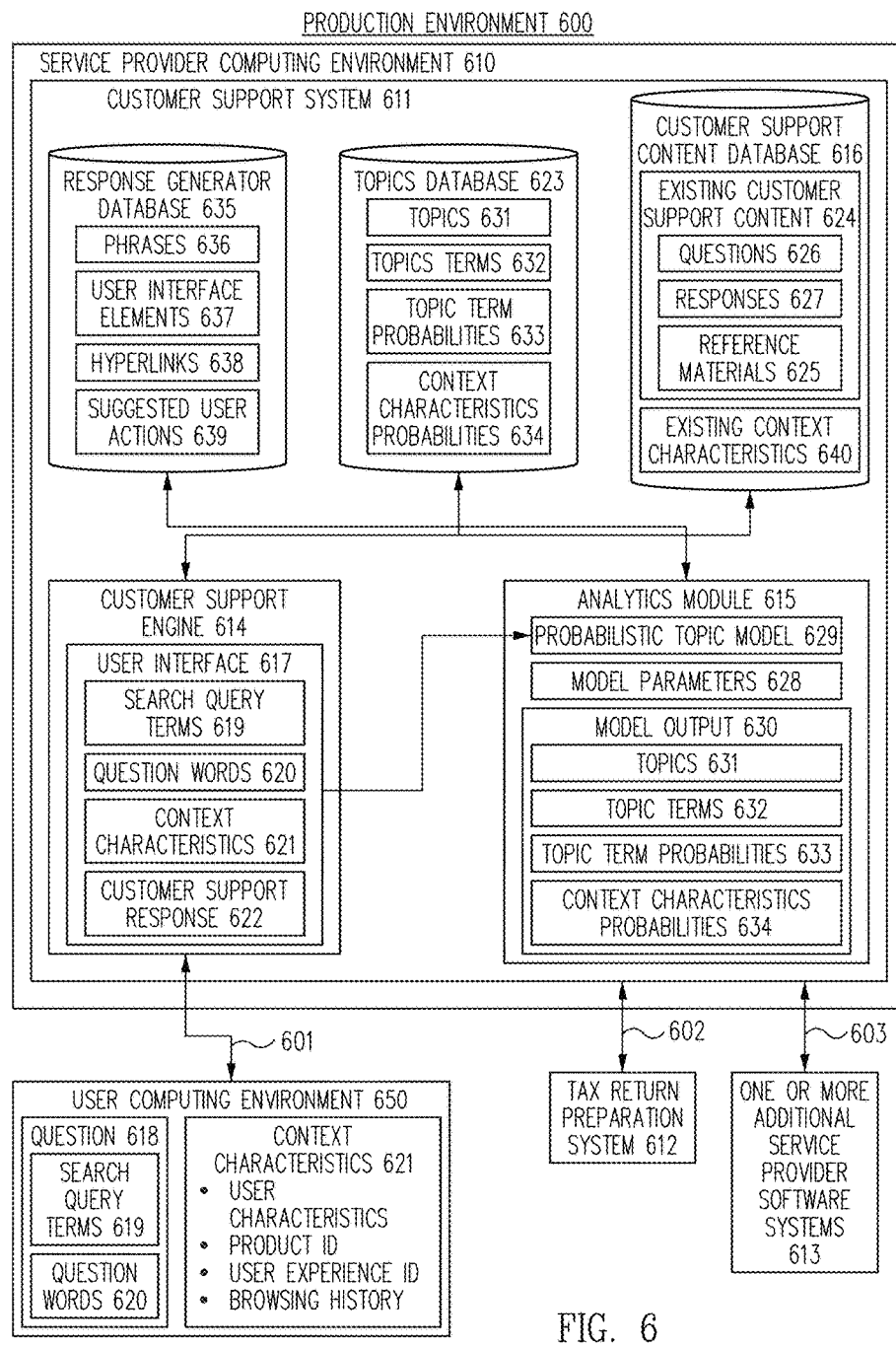
FIG. 6 is a block diagram representing one example of a hardware system and production environment for identifying topics for search query terms based on context characteristics for the search query terms, to provide customer support responses to the search query terms based on a relevant topic of the search query terms, in accordance with one embodiment.

FIG. 6 illustrates a block diagram of a production environment 600 for improving the accuracy of customer support responses, which are used for personalizing user experiences within a customer support system, according to one embodiment. The production environment 600 improves topic identification of search query terms in a customer support system by using contextual information—i.e., context characteristics—to reduce a likelihood of inaccuracy in a probabilistic topic model, and to improve the likelihood of customer satisfaction with the customer support system, according to one embodiment. The production environment 600 selectively applies context characteristics to the topic identification process at least partially based on the characteristics of search query terms received from a user (e.g., when the character count or character length of the search query terms is less than a threshold length—is too short), according to one embodiment. The higher the likelihood is that a probabilistic topic model accurately identifies a relevant topic for received search query terms, the higher the likelihood is that the production environment 600 can satisfactorily respond to the user's search query terms (e.g., by connecting the user with customer support personnel, by providing tips for revising a question, by providing reference materials, etc.). By improving user satisfaction with the customer support system, a customer support system assists the service provider in achieving business objectives such as, but not limited to, converting potential customers into paying customers and attracting potential customers to products offered by the service provider, according to one embodiment.

The production environment 600 uses a probabilistic topic model to analyze search query terms, identify topics that are relevant to the search query terms, and generate customer support responses based on the identified topics, to personalize the user's experience with the customer support system and to provide accurate customer support responses, according to one embodiment. The Inventors have determined that a probabilistic topic model gradually performs more accurately as a character length or a word length of search query terms increases (up to a certain point). Entropy of a probabilistic topic model represents lack of predictability, lack of order, or likelihood of inaccuracy of the probabilistic topic model. Therefore, a character length or word length of search query terms that exceed a predetermined threshold (e.g., 100 characters) is likely to provide a particular level of accuracy in identifying a topic that is relevant to the search query terms. A longer character length generally correlates with additional searchable terms that help increase the topic relevance score of one topic over other topics. In other words, a longer character length of search query terms can increase the likelihood or probability that one particular topic is more relevant to the user's search query terms than other topics. Because getting a user to add more details to a question can be a fruitless endeavor, embodiments of the disclosed customer support system use the context around the search query terms to decrease the likelihood of associating the wrong topic with the search query terms received from the user, which could result in providing an inaccurate/irrelevant response to the user's submission. The context through which the search query terms are referred to as context characteristics (e.g., user characteristics, user experience display ID, product ID, and the like) and added to or used by the probabilistic topic model to determine which topic is relevant (or more relevant than other topics) to the search query terms. Adding the context characteristics increase the likelihood of correctly identifying a topic based on the search query terms, with an effect that is similar to (or possibly better than) having a user enter additional relevant terms to the user's search query terms, according to one embodiment. Incorporating context characteristics into the determination/identification of topics that are relevant to the user's search query terms enables the customer support system to factor in the likelihood that the subject matter the user is viewing, the user's characteristics, and/or the product the user is using can promote, induce, or contribute to questions that may arise for a particular user. Accordingly, embodiments of the disclosed customer support system use a probabilistic topics model to determine a topic that is relevant to a user's search query terms by using both the search query terms and the context characteristics surrounding or associated with those search query terms.

Probabilistic topic algorithms/models extract hidden topics or summaries from content objects (e.g., database entries, webpages, and documents), without requiring the training of the model with known (e.g., manually verified) data sets, according to one embodiment. The customer support system uses a probabilistic topic model to determine which one of multiple topics is relevant, highly-relevant, and/or most-relevant to the search query terms entered into the question and answer customer support system by the user. In one embodiment, the probabilistic topic model uses or is trained with a Latent Dirichlet allocation ("LDA") algorithm.

The production environment 600 includes a service provider computing environment 610 and a user computing environment 650 for improving topic identification of search query terms in a customer support system by using contextual information to reduce a likelihood of inaccuracy in a probabilistic topic model, according to one embodiment. The service provider computing environment 610 includes a customer support system 611 that is associated with and/or configured to support a tax return preparation system 612 and/or one or more additional service provider software systems 613, according to one embodiment. The customer support system 611, the tax return preparation system 612, and the one or more additional service provider software systems 613 are software systems that are communicatively coupled to each other through communications channels 601, 602, and 603, according to one embodiment. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems of the customer support system 611, the tax return preparation system 612, and the one or more additional service provider software systems 613 include, but are not limited to the following: TurboTax AnswerXchange™ available from Intuit, Inc. of Mountain View, Calif.; TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment, the customer support system 611 is a social question and answer system, provided to support users of the software system (e.g., the tax return preparation system 612 and/or one or more additional service provider software systems 613).

The customer support system 611 includes a customer support engine 614, an analytics module 615, and a customer support content database 616 for identifying topics for search query terms based on context characteristics for the search query terms, to provide personalized customer support responses to the search query terms based on a relevant topic of the search query terms, according to one embodiment.

The customer support engine 614 receives a question 618, search query terms 619 for the question 618, question words 620 for the question 618, context characteristics 621 from the user computing environment 650, to generate and provide a customer support response 622 that is based on one or more of the question 618, search query terms 619, question words 620, and context characteristics 621, according to one embodiment.

The customer support engine 614 receives information from the user computing environment 650 with a user interface 617, according to one embodiment. The term user interface is interchangeably used with the term user experience display, according to one embodiment. The user interface 617 includes, but is not limited to one or more data entry fields; question quality indicators; images; backgrounds; avatars; highlighting mechanisms; icons; boxes; slides; buttons; and any other user interface elements or features that individually, or in combination, create a user experience, as discussed herein, and/or as known in the art at the time of filing, and/or as developed after the time of filing.

The question 618 represents a question that is formulated by a user. The question 618 may be poorly worded and may merely be a statement or may be a loosely organized collection of the search query terms 619. In one embodiment, the customer support response 622 is generated and provided to the user after the question 618 is submitted (e.g., with a "submit" button) to the customer support system for response. In one embodiment, the customer support response 622 is generated and provided to the user before the question 618 is submitted to the customer support system for response, by analyzing the search query terms 619, the question words 620, and/or the context characteristics 621 as the user enters the information into the customer support system (e.g., real-time analysis while the question is unsubmitted).

The search query terms 619 include the words that are used to formulate the question 618, according to one embodiment. The search query terms 619 are terms that are used by one or more search engines or analytics models to determine the topic, content, and/or substance of a question or of search query terms, according to one embodiment.

The question words 620 include one or more words that are used to identify a string of characters as a question. Examples of the question words 620 include, but are not limited to, do, why, can, how, when, where, why, and the like, according to one embodiment.

The context characteristics 621 include user characteristics of the user who provides the search query terms, user experience display identifiers for user experience displays viewed by the user, product identifiers for the software system(s) used by the user, clickstream data for the user, browsing history for the user, and the like, according to one embodiment. The user experience identifiers are for user experience displays that have been viewed, navigated, and/or manipulated by the user in the tax return preparation system 612, in the one or more additional service provider software systems 613, and/or in the customer support system 611, according to one embodiment. The user characteristics represent information that is obtained from the user through the user computing environment 650, as well as information that is obtained from other sources such as the tax return preparation system 612 and/or the one or more additional service provider software systems 613, according to one embodiment. For example, the user characteristics can include information from existing tax return data, such as one or more previous years' tax return data for a particular user. The existing tax return data is stored in a data store, a database, and/or a data structure, according to one embodiment. The user characteristics can also include information that the tax return preparation system gathers directly from one or more external sources such as, but not limited to, a payroll management company, state agencies, federal agencies, employers, military records, public records, private companies, and the like, according to one embodiment. More particular examples of the user characteristics include, but are not limited to, a user's name, an age, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of a user's tax return, according to various embodiments.

The customer support system 611 applies the search query terms 619, the question words 620, and/or the context characteristic 621 to a probabilistic topic model to identify relevant topics and/or a most relevant topic for the search query terms 619, according to one embodiment. The customer support system 611 can use a pre-trained model or algorithm, such as the Latent Dirichlet allocation algorithm to analyze the search query terms 619, the question words 620, and/or the context characteristic 621, according to one embodiment. Alternatively, the customer support system 611 trains the probabilistic topic model by applying one or more analytics algorithms, such as the Latent Dirichlet allocation algorithm, to existing content prior to analyzing the search query terms 619, the question words 620, and/or the context characteristic 621 to identify relevant topics and/or a most relevant topic for the search query terms 619, according to one embodiment.

Prior to generating the customer support response 622, the customer support engine 614 and/or the customer support system 611 uses the analytics module 615 to train a probabilistic topic model by populating a topics database 623 with information that can be used to identify relevant topics for the search query terms 619, according to one embodiment. The analytics module 615 uses existing customer support content 624 and/or existing context characteristics 640, from a customer support content database 616, to populate the topics database 623, according to one embodiment. The existing customer support content 624 includes questions 626 that have been received from users of the customer support system 611, responses 627 that have been provided by customer support personnel (e.g., voluntary customer support personnel) in response to the questions 626, and reference materials 625 that are used to provide self-guided assistance to the user. The reference materials 625 include, but are not limited to, topical indices, dictionaries, articles, and self-help guides that are related to preparing and filing tax returns, managing personal finances, paying bills, managing personal or commercial budgets, and/or performing other commercial or personal financial transactions, according to one embodiment. The existing context characteristics 640 include user characteristics, product identifiers used, user experience displays visited, clickstream data, and browsing histories for users of the customer support system 611, for the tax return preparation system 612, and/or for the one or more additional service provider software systems 613, according to one embodiment.

The analytics module 615 applies the existing customer support content 624, the existing context characteristics 640, and/or the model parameters 628 to the probabilistic topic model 629, according to one embodiment. The model parameters 628 include, but are not limited to, a number of topics to be identified/defined by the probabilistic topic model 629, a number of words in a document, and a total number of words to analyze, according to one embodiment.

In response to receiving the existing customer support content 624 and/or the existing context characteristics 640, the probabilistic topic model 629 (or a training algorithm such as the Latent Dirichlet allocation algorithm) generates model output 630, according to one embodiment. The model output 630 includes topics 631, topic terms 632, topic term probabilities 633, and/or context characteristics probabilities 634, according to one embodiment.

The topics 631 represent themes, subjects, and/or categories of information that are included in the existing customer support content 624 that is input into the probabilistic topic model 629, according to one embodiment. As a result, the topics 631 represent themes, subjects, and/or categories of information stored in the customer support content database 616, according to one embodiment.

Figure 7:
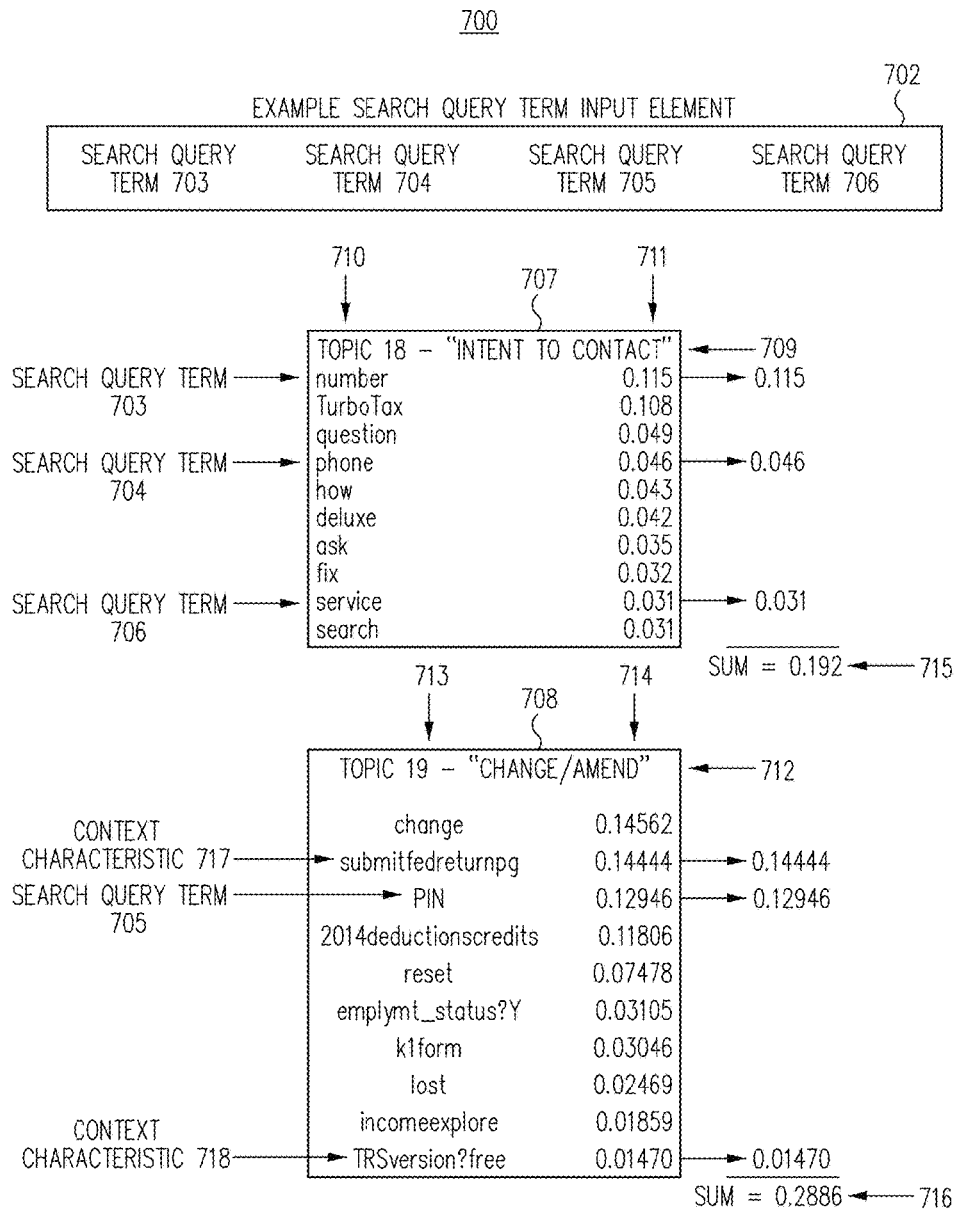
FIG. 7 is a diagram that illustrates one example of a technique for determining a relevant topic for a plurality of search terms received from a user, in accordance with one embodiment.

The topic terms 632 represent words that are likely to appear in the topics 631 (e.g., in a question or document including the topics 631), according to one embodiment. The topic terms 632 have topic term probabilities 633 of occurring in the topics 631, according to one embodiment. In other words, each of the topic terms 632 has a topic term probability 633 that defines the probability of a topic term occurring in a topic, according to one embodiment. Although each of the topic terms 632 may probabilistically occur in more than one of the topics 631, the topic term probabilities 633 for reoccurring topic terms 632 will likely be different for different topics 631, according to one embodiment. Additional illustrative examples of topics 631, topic terms 632, and topic term probabilities 633 are illustrated in FIG. 7 and are discussed below in relation to diagram 700.

The context characteristics probabilities 634 quantify the likelihood that a user will have question about a topic when one or more context characteristics exist, according to one embodiment. The context characteristics probabilities 634 represent a likelihood or a probabilistic relationship between a topic and context characteristics, and can be used by the probabilistic topic model 629 to add certainty to the identification of a particular topic as being relevant to the search query terms 619. In one embodiment, the analytics module 615 and/or the probabilistic topic model 629 generates the context characteristics probabilities by applying one or more analytics algorithms (e.g., regression, neural networks, Latent Dirichlet allocation) to the existing context characteristics 640 to determine a likelihood or probability of a particular context characteristic of occurring with, promoting, or inducing a question or search query terms for a particular topic, according to one embodiment.

The analytics module 615 and/or the customer support engine 614 populates the topics database 623 with the topics 631, the topic terms 632, the topic term probabilities 633, and the context characteristics probabilities, to enable the probabilistic topic model 629, the customer support engine 614, and/or the customer support system 611 to identify those of the topics 631 that are relevant to the search query terms 619, according to one embodiment. In one embodiment, the topics database 623 and/or contents of the topics database 623 are part of the probabilistic topic model 629.

When the customer support engine 614 detects the question 618 or the search query terms 619, the analytics module 615, the customer support engine 614 and/or the customer support system 611 applies the search query terms 619 and/or the question words 620 to the probabilistic topic model 629 to identify topic relevance scores for topics that are relevant to the search query terms and/or to the question words 620, according to one embodiment. To apply the search query terms 619 and/or the question words 620 to the probabilistic topic model 629, the analytics module 615, the customer support engine 614, and/or the customer support system 611 searches the topics database 623 to find topic terms 632 that match the search query terms 619 and/or the question words 620, in order to identify one or more of the topics 631 that are relevant to the search query terms 619, according to one embodiment. Once the analytics module 615, the customer support engine 614, and/or the customer support system 611 identifies topic terms 632 that match the search query terms 619, the analytics module 615, the customer support engine 614, and/or the customer support system 611 associates the topic term probabilities 633 of the matching topic terms 632 with the search query terms 619, according to one embodiment. Once the topic term probabilities 633 have been associated with the search query terms 619, the analytics module 615, the customer support engine 614, and/or the customer support system 611 combines the associated topic term probabilities 633 to determine a level of relevance (e.g., a topic relevance score) for each of the topics 631 in relation to the search query terms 619, according to one embodiment.

If one or more characteristics of the search query terms 619 fails to satisfy one or more predetermined criteria or thresholds, the analytics module 615, the customer support engine 614, and/or the customer support system 611 are configured to apply the context characteristics 621 to the probabilistic topic model 629 to improve the level of relevant and/or the topic relevance scores for those of the topics 631 that have been identified as relevant to the search query terms 619, according to one embodiment. The one or more predetermined criteria or thresholds established for the characteristics of the search query terms 619 include a combined character length of the search query terms 619 or a number of words for the search query terms 619, according to one embodiment. In one embodiment, the analytics module 615, the customer support engine 614, and/or the customer support system 611 are configured to apply the context characteristics 621 to the probabilistic topic model 629 if the combined character length of the search query terms 619 is less than a threshold such as 100 characters.

In one embodiment, the analytics module 615, the customer support engine 614, and/or the customer support system 611 are configured to apply the context characteristics 621 to the probabilistic topic model 629 if characteristics of the search query terms 619 fail to satisfy one or more predetermined criteria thresholds. In another embodiment, the analytics module 615, the customer support engine 614, and/or the customer support system 611 are configured to apply the context characteristics 621 to the probabilistic topic model 629 regardless of the characteristics of the search query terms 619.

The analytics module 615, the customer support engine 614, and/or the customer support system 611 apply the context characteristics 621 to the probabilistic topic model 629 by searching the topics database 623 for context characteristics probabilities 634 that match or correspond to one or more of the context characteristics 621 received from the user or retrieved about the user, according to one embodiment. The context characteristics probabilities 634 that are associated with the context characteristics 621 that exist for the current user are combined with or added to the likelihood of relevance and/or the topic relevance scores of the topics 631 that have been identified as being relevant to the search query terms 619, in order to increase the likelihood of the probabilistic topic model 629 correctly identifying the most relevant of the topics 631.

Once the most relevant one of the topics 631 is identified (e.g., by selecting the topic with the highest level of relevance for the highest topic relevance score), the customer support engine 614 and/or the customer support system 611 personalizes the customer support response 622 by using contents of the response generator database 635, according to one embodiment. The customer support engine 614 and/or the customer support system 611 then provide the customer support response 622 to the user computing environment 650, according to one embodiment. In one embodiment, the customer support engine 614 and/or the customer support system 611 provide a customer support response 622 to the user computing environment 650 before the user submits the question 618 to the customer support system 611 for response by customer support personnel.

The response generator database 635 includes phrases or messages 636, user interface elements 637, hyperlinks 638, and suggested user actions 639, according to one embodiment. The phrases or messages 636 include one or more predetermined phrases, messages, and/or sentences that are used by the customer support engine 614 and/or the customer support system 611 in formulating the customer support response 622, according to one embodiment. The user interface elements 637, include, but are not limited to, one or more buttons, slides, text boxes, buttons, pop-up windows, display boxes, and the like, useful for presenting the phrases or messages 636, the hyperlinks 638, and the suggest user actions 639 to the user, according to one embodiment. The hyperlinks 638 include one or more links to various user experience displays (e.g., webpages) that contain information, telephone numbers, webchat tools/windows, and the like, according to one embodiment. The suggested user actions 639, includes, but is not limited to, reviewing reference materials 625 for the relevant topic identified, reviewing one or more of the questions 626 and one or more of the responses 627 that are synonymous with the question 618 and/or the search query terms 619 (based on the relevant topic identified), selecting a hyperlink or button to begin a telephone call with customer support, selecting hyperlink or button to navigate to the reference materials 625 that are relevant to the topic identified, or the like, according to one embodiment.

The customer support engine 614 and/or the customer support system 611 generates the customer support response 622 based on one or more of the search query terms 619, the question words 620, and the context characteristics 621, according to one embodiment. The customer support engine 614 and/or the customer support system 611 includes phrases or messages 636, user interface elements 637, hyperlinks 638, and/or suggested user actions 639, based on the topics 631 identified as relevant to the search query terms 619, to notify the user that the search query terms 619 have been accurately identified and confirm for the user that the customer support system 611 is proactively taking steps to address the search query terms 619 in the best interest of the user, according to one embodiment. In the case where the customer support system 611 provides the customer support response 622 prior to the user submitting the question 618 to the customer support system 611 for response by customer support personnel, the customer support system 611 advantageously save the user time while building goodwill with the user by reducing time delays associated with waiting for an answer to the question 618 from the customer support personnel, according to one embodiment.

The customer support engine 614 provides the customer support response 622 to the user computing environment 650 with the user interface 617, according to one embodiment.

FIG. 7 illustrates a diagram 700 that illustrates one technique for determining a relevant topic for search query terms received from a user by including context characteristics, for the production environment 600, according to one embodiment. The diagram 700 includes a search query term input element 702, e.g., a text box, for receiving search query terms (or a question comprising search query terms) from a user, according to one embodiment. The search query term input element 702 is an example of a search query term input element, and other embodiments of search query term input elements (e.g., user interface elements) can be used. The search query term input element 702 includes search query terms entered into the search query term input element 702, according to one embodiment. The example search query terms include a search query term 703, search query term 704, search query term 705, and search query term 706, according to one embodiment. Although four example search query terms are illustrated, many more search query terms or fewer search query terms can also be received and analyzed with the customer support system to identify a relevant topic for search query terms, according to one embodiment.

The diagram 700 includes two example entries for the topics database 623 that can be used to determine a topic that is relevant to the search query terms 703, 704, 705, 706, according to one embodiment. The diagram 700 includes a topics database entry 707 and a topics database entry 708, to illustrate an example process of determining a most relevant, a highest relevant, or multiple relevant topics for the search query terms 703, 704, 705, 706, according to one embodiment. The topics database entry 707 includes a topic 709, topic terms 710, and topic term probabilities 711, according to one embodiment. The topic database entry 708 includes a topic 712, topic terms combined with context characteristics 713, and topic term probabilities combined with context characteristics probabilities 714, according to one embodiment. The topic database entries 707 and 708 are examples of entries that are made to the topics database 623 (shown in FIG. 6), according to one embodiment. The topics 709 and 712 are examples of the topics 631 in the topics database 623, according to one embodiment. The topic terms 710 are examples of topic terms 632 entered into the topics database 623, according to one embodiment. The topic term probabilities 711 are examples of the topic term probabilities 633 entered into the topics database 623, according to one embodiment. The topics 709, 712 include a numerical identifier (e.g., topic "18" and topic "1") and an alphabetical identifier (e.g., "intent to contact" topic and "deductions" topic), according to one embodiment.

The topics database entry 708 includes context characteristics of "submitfedreturnpg", "2014deductionscredits", "emplymt_status?Y", "k1form", "incomeexplore", and "TRSversion?free", which represent examples of user experience displays visited by a user, user characteristics, and product identifiers that may be stored in the topics database 623 with corresponding context characteristics probabilities 634, according to one embodiment. For these example context characteristics, "submitfedreturnpg" represents an example of a user experience display identifier for a user experience display page for submitting a federal tax return, "2014deductionscredits" represents an example of a user experience display identifier for a user experience display page for answering questions about deductions and credits for 2014 taxes, "emplymt_status?Y" represents a user characteristic for whether the user is employed, "k1form" represents an example of a user experience display identifier for a user experience display page for filling out a K1 tax form, "incomeexplore" represents an example of a user experience display identifier for a user experience display page for determining income for a user in a tax return preparation system, and "TRSversion?free" represents an identifier of a free version of a tax return preparation system, according to one embodiment.

The customer support system 611 determines a topic relevance score 715 for the topic 709 and a topic relevance score 716 for the topic 712 by combining or adding the topic term probabilities and context characteristics probabilities that are associated with one or more of the search query terms 703, 704, 705, 706. The customer support system 611 receives the search query terms 703, 704, 705, 706 from the user in the search query term input element 702, according to one embodiment. The customer support system 611 searches the topics database entries 707 and 708 for topic terms that match the search query terms 703, 704, 705, 706 and for context characteristics that exist during the submission of the search query terms 703, 704, 705, 706, according to one embodiment. The customer support system 611 then associates the topic term probabilities 711, 714 of the topic terms 710, 713 that match the search query terms 703, 704, 705, 706, to associate the relevant topic term probabilities 711, 714, to the search query terms 703, 704, 705, 706, according to one embodiment. For each topic 709 and 712, the customer support system 611 determines the topic relevance scores 715, 716, by combining the topic term probabilities 711, 714 that are relevant to and associated with the search query terms 703, 704, 705, 706 that exist in the topics 709, 712.

For example, if the search query term 703 is the topic term "number", the search query term 704 is the topic term "phone", the search query term 705 is the topic term "PIN", and the search query term 706 is the search query term "service", then the topic relevance score for the topic 709 is 0.192, and the topic relevance score for the topic 712 is 0.12946, without taking context characteristics into account. If user visited or was directed to the customer support system 611 from "submitfedreturnpg", which represents an example of a user experience display identifier for a user experience display page for submitting a federal tax return, then the topic relevance score is increased by 0.14444 for context characteristic 717. If the user is using a free version of a tax return preparation system then a context characteristic 718 (e.g., "TRSversion?free") applies and the topic relevance score is increased by 0.01470. Accordingly, the topic relevance score for the topic 712, including context characteristics, is 0.2886, making topic 712—"change/amend" more relevant to the search query terms 703, 704, 705, 706 than the topic 709—"intent to contact", according to one example of an embodiment.

The customer support system 611 determines a most relevant or a highest relevant topic for the search terms by ranking, sorting, and/or comparing the topic relevance scores 715, 716 for each of the topics 709, 712, according to one embodiment. The customer support system 611 determines that the topic with the highest topic relevance score is the highest relevant topic to the search query terms 703, 704, 705, 706, according to one embodiment. Accordingly, because the topic relevance score for topic 709 (e.g., 0.192) is less than the topic relevance score 716 for the topic 712 (e.g., 0.2886), the customer support system 611 determines that the relevant topic for the search query terms 703, 704, 705, 706 is the topic 712—"change/amend", according to one embodiment.

In one embodiment, the topics database entries 707, 708 also include question words, and the question words are assigned topic term probabilities for determining the topic relevance scores, of the topics, according to one embodiment. Examples of question words such as how, why, do, can, where, and when can each be associated with a topic term probability for each of the number of topics in the customer support system 611. The question words can be included in the topics database entries (e.g., 707, 708), and can be combined or added to the topic term probabilities of the topic terms that match the search terms, according to one embodiment.

PROCESS

Figure 8:
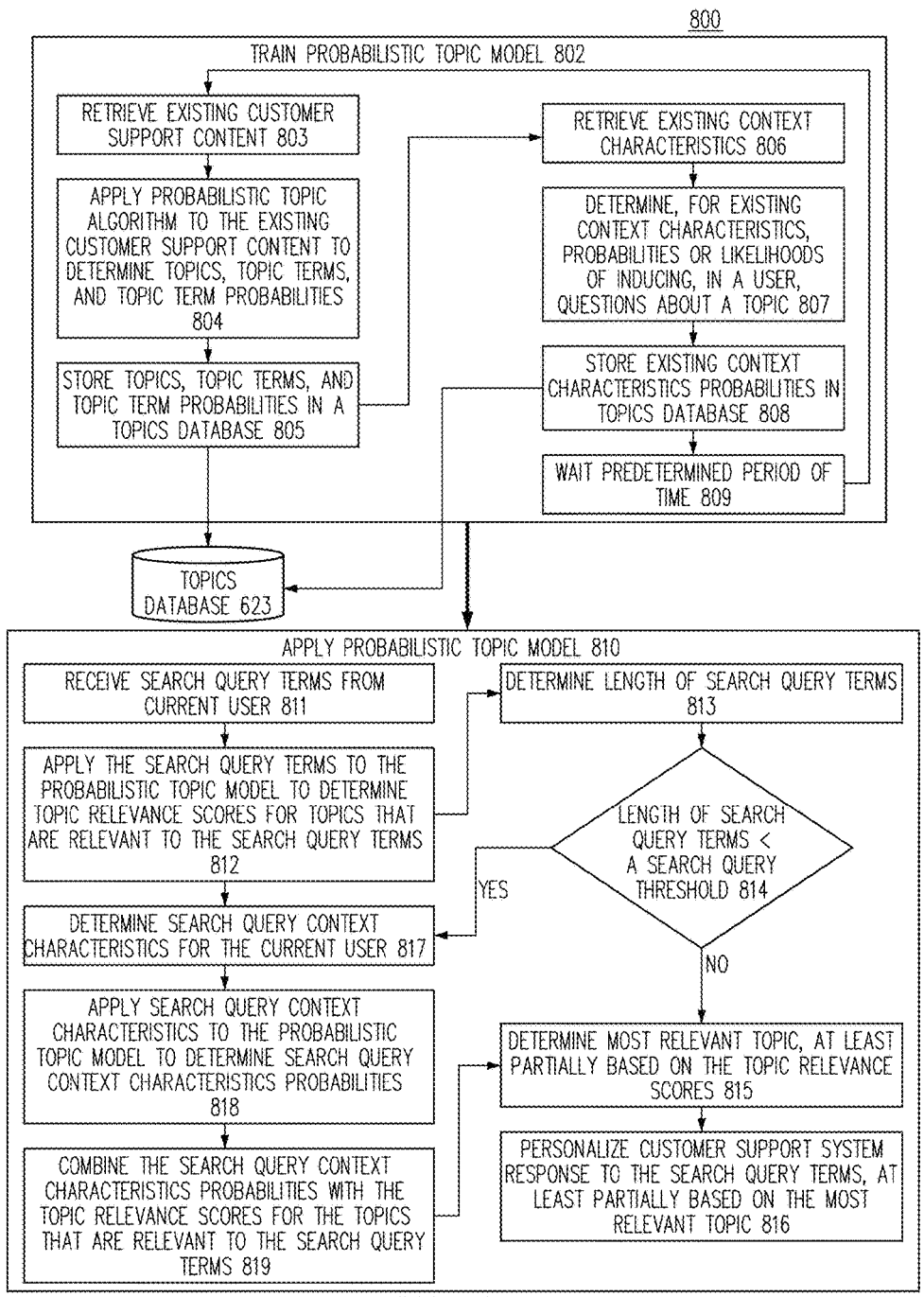
FIG. 8 is a flow diagram that illustrates an example of a method for identifying topics for search query terms based on context characteristics for the search query terms, to provide customer support responses to the search query terms based on a relevant topic of the search query terms, in accordance with one embodiment.

FIG. 8 illustrates an example of a process 800 for identifying topics for search query terms based on context characteristics for the search query terms, to provide personalized customer support responses to the search query terms based on a relevant topic of the search query terms, according to one embodiment.

At operation 802, the process trains a probabilistic topic model, according to one embodiment. Operation 802 includes operations 803-809, according to one embodiment. Operation 802 proceeds to operation 810, upon completion of one or more of operations 803-809, according to one embodiment.

At operation 803, the process retrieves existing customer support content, according to one embodiment. Operation 803 proceeds to operation 804, according to one embodiment.

At operation 804, the process applies a probabilistic topic algorithm to the existing customer support content to determine topics, topic terms, and topic term probabilities, according to one embodiment. Operation 804 proceeds to operation 805, according to one embodiment.

At operation 805, the process stores topics, topic terms, and topic term probabilities in a topic database, e.g., the topics database 623, according to one embodiment. Operation 805 proceeds to operation 806, according to one embodiment.

At operation 806, the process retrieves existing context characteristics, according to one embodiment. Operation 806 proceeds to operation 807, according to one embodiment.

At operation 807, the process determines, for existing context characteristics, probabilities or likelihood of inducing, in a user, questions about a topic, according to one embodiment. Operation 807 proceeds to operation 808, according to one embodiment.

At operation 808, the process stores existing context characteristics probabilities in the topics database, according to one embodiment. Operation 808 proceeds to operation 809, according to one embodiment.

At operation 809, the process waits a predetermined period of time, according to one embodiment. The process waits a predetermined period of time such as, but not limited to, a second, a minute, half an hour, an hour, a few hours, a day, a few days, a week, a few weeks, a month, a quarter, a year, and the like, according to various embodiments. While waiting the predetermined period of time, the process allows the customer support system to acquire additional customer support content and add the additional customer support content to the existing customer support content, according to one embodiment. After the existing customer support content has been updated with additional customer support content, the process includes retraining the probabilistic topic model with the combination of the additional customer support content and the existing customer support content, which provides updated questions, answers, and other customer support content by which to determine topics that may be relevant to search query terms entered into the customer support system by a user, according to one embodiment. Operation 809 proceeds to operation 803, according to one embodiment.

At operation 810, the process applies the probabilistic topic model, according to one embodiment. Operation 810 includes operations 811-819, according to one embodiment. Upon completion of operation 810, the process ends, process reiterates operation 810, and/or the process returns to operation 802, according to various embodiments. In one embodiment, the process skips operation 802 and begins at operation 810 because the probabilistic topic model is already trained to identify topics related to the search query terms.

At operation 811, the process receives search query terms from a current user, according to one embodiment. Operation 811 proceeds to operation 812, according to one embodiment.

At operation 812, the process applies the search query terms to the probabilistic topic model to determine topic relevance scores for topics that are relevant to the search query terms, according to one embodiment. Operation 812 proceeds to operation 813, according to one embodiment.

At operation 813, the process determines the length of the search query terms, according to one embodiment. The length of the search query terms can be a number of characters or a number of words for the search query terms, according to one embodiment. Operation 813 proceeds to operation 814, according to one embodiment.

At operation 814, the process determines whether the length of the search query terms is below a search query threshold, according to one embodiment. The length of the search query terms is inversely related to a likelihood of inaccuracy of the topic relevance scores, so a shorter length of search query terms corresponds with a greater likelihood of inaccuracy in the topic relevance scores or in the selection of a relevant topic for the search query terms, according to one embodiment. If the length of the search query terms is greater than or equal to a search query threshold, operation 814 proceeds to operation 815, according to one embodiment. If the length of the search query terms is less than the search query threshold, operation 814 proceeds to operation 817, according to one embodiment.

At operation 815, the process determines the most relevant topic, at least partially based on the topic relevance scores, according to one embodiment. For example, the process sorts the topic relevance scores in descending order, and selects the highest of the sorted topic relevance scores as being associated with the most relevant topic, according to one embodiment. Operation 815 proceeds to operation 816, according to one embodiment.

At operation 816, the process personalizes a customer support system response to the search query terms, at least partially based on the most relevant topic, according to one embodiment.

At operation 817, the process determines the search query context characteristics for the current user, according to one embodiment. Operation 817 proceeds to operation 818, according to one embodiment.

At operation 818, the process applies the search query context characteristics to the probabilistic topic model to determine search query context characteristics probabilities, according to one embodiment. Operation 818 proceeds to operation 819, according to one embodiment.

At operation 819, the process combines the search query context characteristics probabilities with the topic relevance scores for the topics that are relevant to the search query terms, according to one embodiment. In one embodiment, the process adds the search query context characteristics probabilities to the topic relevance scores to update the topic relevance scores to reflect the search query context characteristics received, retrieved, or otherwise determined by the process for the current user, according to one embodiment. Operation 819 proceeds to operation 815, according to one embodiment.

Figure 9:
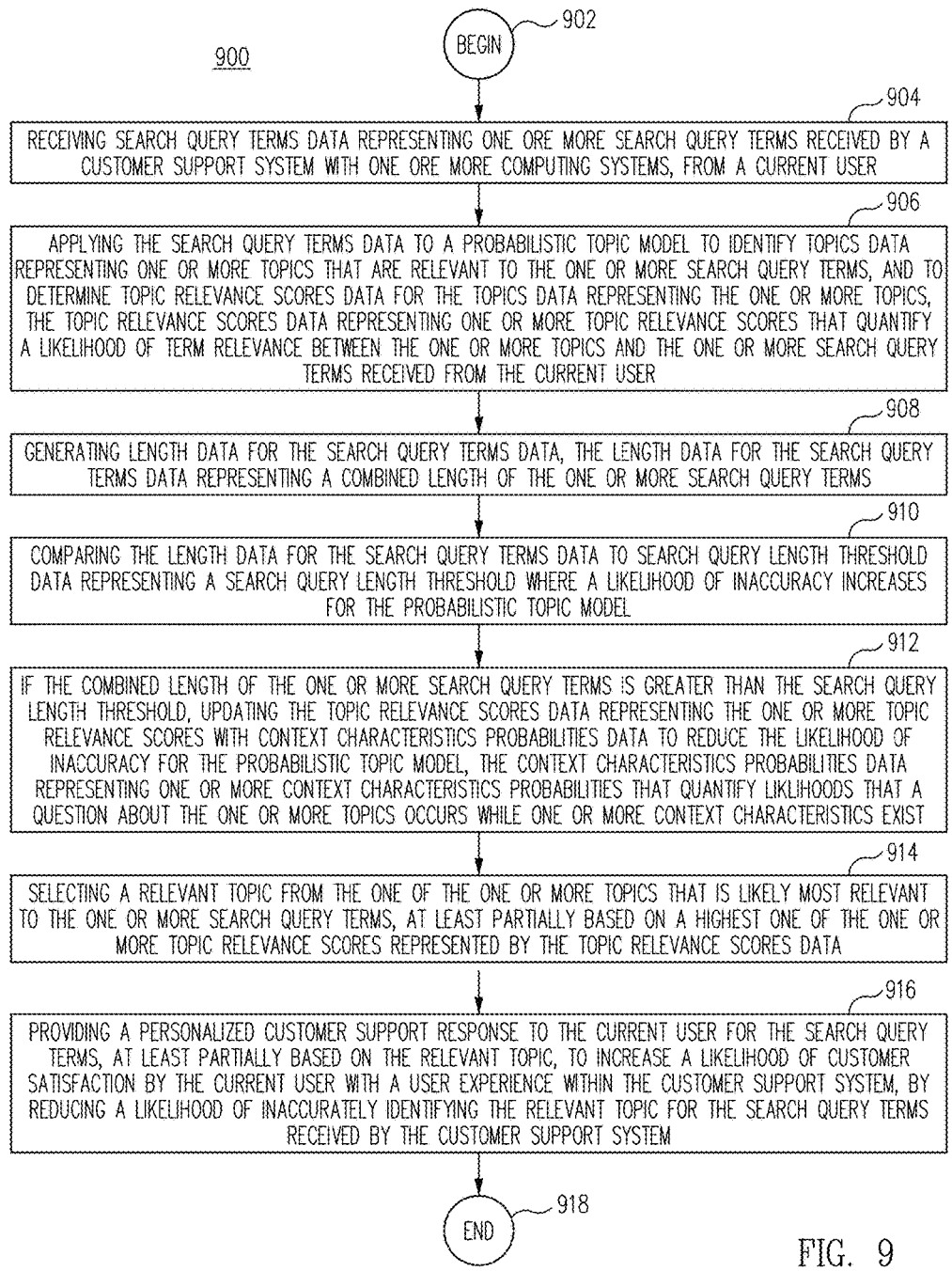
FIG. 9 is a flow diagram that illustrates an example of a method for identifying topics for search query terms based on context characteristics for the search query terms, to provide customer support responses to the search query terms based on a relevant topic of the search query terms, in accordance with one embodiment.

FIG. 9 is a flow diagram of a method 900 for improving topic identification of search query terms in a customer support system by using contextual information to reduce a likelihood of inaccuracy in a probabilistic topic model, and to improve the likelihood of customer satisfaction with the customer support system, in accordance with one embodiment.

At operation 902, the process begins, according to one embodiment. Operation 902 proceeds to operation 904, according to one embodiment.

At operation 904, the process includes receiving search query terms data representing one or more search query terms received by a customer support system with one or more computing systems, from a current user, according to one embodiment.

At operation 906, the process includes applying the search query terms data to a probabilistic topic model to identify topics data representing one or more topics that are relevant to the one or more search query terms, and to determine topic relevance scores data for the topics data representing the one or more topics, the topic relevance scores data representing one or more topic relevance scores that quantify a likelihood of term relevance between the one or more topics and the one or more search query terms received from the current user, according to one embodiment.

At operation 908, the process includes generating length data for the search query terms data, the length data for the search query terms data representing a combined length of the one or more search query terms, according to one embodiment.

At operation 910, the process includes comparing the length data for the search query terms data to search query length threshold data representing a search query length threshold where a likelihood of inaccuracy increases for the probabilistic topic model, according to one embodiment.

At operation 912, the process includes, if the combined length of the one or more search query terms is greater than the search query length threshold, updating the topic relevance scores data representing the one or more topic relevance scores with context characteristics probabilities data to reduce the likelihood of inaccuracy for the probabilistic topic model, according to one embodiment. The context characteristics probabilities data represent one or more context characteristics probabilities that quantify likelihoods that a question about the one or more topics occurs while one or more context characteristics exist, according to one embodiment.

Updating the topic relevance scores data includes identifying context characteristics data representing the context characteristics for the search query terms, according to one embodiment. The context characteristics data are selected from a group of context characteristics data consisting of: data representing user characteristics of the current user; data representing identification of user experience displays visited by the current user, the user experience displays being provided by one or more service provider systems associated with the customer support system; and data representing identification of one or more service provider systems associated with the customer support system and used by the current user, according to one embodiment.

Updating the topic relevance scores data includes applying the context characteristics data to the probabilistic topic model to generate the context characteristics probabilities data representing the one or more context characteristics probabilities, according to one embodiment.

Updating the topic relevance scores data includes combining the context characteristics probabilities data with the topic relevance scores data to update the topic relevance scores data to reflect a combination of the context characteristics data and the topic relevance scores data, according to one embodiment. Operation 912 proceeds to operation 914, according to one embodiment.

At operation 914, the process includes selecting a relevant topic from the one of the one or more topics that is likely most relevant to the one or more search query terms, at least partially based on a highest one of the one or more topic relevance scores represented by the topic relevance scores data, according to one embodiment. Operation 914 proceeds to operation 916, according to one embodiment.

At operation 916, the process includes providing a personalized customer support response to the current user for the search query terms, at least partially based on the relevant topic, to increase a likelihood of customer satisfaction by the current user with a user experience within the customer support system, by reducing a likelihood of inaccurately identifying the relevant topic for the search query terms received by the customer support system, according to one embodiment. Operation 916 proceeds to operation 918, where the process ends, according to one embodiment.

Using the disclosed embodiments of a method and system for improving topic identification of search query terms in a customer support system by using contextual information to reduce a likelihood of inaccuracy in a probabilistic topic model, and to improve the likelihood of customer satisfaction with the customer support system provides more accurate responses to user search queries, even with search query terms that are too short or overly concise for a probabilistic topic model to function effectively. Therefore, the disclosed embodiments provide a technical solution to the long standing technical problem of how to improve the accuracy of interpreting user search query terms that are too short/brief.

The result is a much more responsive and accurate method and system for applying probabilistic topic models to content to response to user search query terms (e.g., questions) in a customer support system. This, in turn, results in: less human and processor resources being dedicated to processing redundant customer support requests because the primary requests received inaccurate responses; less memory and storage bandwidth being dedicated to buffering and storing complaints for poorly-worded responses to customer questions; and less communication bandwidth being utilized by inaccurate responses to overly concise search query terms.

The disclosed method and system for improving topic identification of search query terms in a customer support system by using contextual information to reduce a likelihood of inaccuracy in a probabilistic topic model, and to improve the likelihood of customer satisfaction with the customer support system does not encompass, embody, or preclude other forms of innovation in the area of user experience personalization. In addition, the disclosed method and system for improving topic identification of search query terms in a customer support system by using contextual information to reduce a likelihood of inaccuracy in a probabilistic topic model, and to improve the likelihood of customer satisfaction with the customer support system is not related to any fundamental economic practice, fundamental data processing practice, mental steps, or pen and paper based solutions, and is, in fact, directed to the relatively new problem of improving topic identification of search query terms in a customer support system. Consequently, the disclosed method and system for improving topic identification of search query terms in a customer support system by using contextual information to reduce a likelihood of inaccuracy in a probabilistic topic model, and to improve the likelihood of customer satisfaction with the customer support system is not directed to, does not encompass, and is not merely, an abstract idea or concept.

In addition, the disclosed method and system for improving topic identification of search query terms in a customer support system by using contextual information to reduce a likelihood of inaccuracy in a probabilistic topic model, and to improve the likelihood of customer satisfaction with the customer support system provides for significant improvements to the technical fields of user experience, electronic transaction data processing, financial transaction processing, electronic tax return preparation, customer support systems, data processing, and data management.

In addition, as discussed above, the disclosed method and system for improving topic identification of search query terms in a customer support system by using contextual information to reduce a likelihood of inaccuracy in a probabilistic topic model, and to improve the likelihood of customer satisfaction with the customer support system more accurately identifies the needs of a user, which results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for improving topic identification of search query terms in a customer support system by using contextual information to reduce a likelihood of inaccuracy in a probabilistic topic model, and to improve the likelihood of customer satisfaction with the customer support system.

In accordance with an embodiment a method improves a likelihood of user satisfaction with a customer support response that is provided by a customer support system in response to receiving search query terms, by using context information to reduce a likelihood of inaccurately identifying a relevant topic for the search query terms with a probabilistic topic model. The method includes receiving search query terms data representing one or more search query terms received by a customer support system with one or more computing systems, from a current user, according to one embodiment. The method includes applying the search query terms data to a probabilistic topic model to identify topics data representing one or more topics that are relevant to the one or more search query terms, and to determine topic relevance scores data for the topics data representing the one or more topics, the topic relevance scores data representing one or more topic relevance scores that quantify a likelihood of relevance between the one or more topics and the one or more search query terms received from the current user, according to one embodiment. The method includes generating length data for the search query terms data, the length data for the search query terms data representing a combined length of the one or more search query terms, according to one embodiment. The method includes comparing the length data for the search query terms data to search query length threshold data representing a search query length threshold, below which a likelihood of inaccuracy increases for the probabilistic topic model, according to one embodiment. The method includes, if the combined length of the one or more search query terms is less than the search query length threshold, updating the topic relevance scores data representing the one or more topic relevance scores with context characteristics probabilities data to reduce the likelihood of inaccuracy for the probabilistic topic model, the context characteristics probabilities data representing one or more context characteristics probabilities that quantify a likelihood that a question about the one or more topics occurs while one or more context characteristics for the search query terms exist, according to one embodiment. Updating the topic relevance scores data includes identifying context characteristics data representing the context characteristics for the search query terms, according to one embodiment. The context characteristics data are selected from a group of context characteristics data consisting of data representing user characteristics of the current user; data representing identification of user experience displays visited by the current user, the user experience displays being provided by one or more service provider systems associated with the customer support system; and data representing identification of the one or more service provider systems associated with the customer support system and used by the current user, according to one embodiment. Updating the topic relevance scores data includes applying the context characteristics data to the probabilistic topic model to generate the context characteristics probabilities data representing the one or more context characteristics probabilities, according to one embodiment. Updating the topic relevance scores data includes combining the context characteristics probabilities data with the topic relevance scores data to update the topic relevance scores data to reflect a combination of the context characteristics probabilities data and the topic relevance scores data, according to one embodiment. The method includes selecting a relevant topic from the one or more topics that is likely most relevant to the one or more search query terms, at least partially based on a highest one of the one or more topic relevance scores represented by the topic relevance scores data, according to one embodiment. The method includes providing a personalized customer support response to the current user for the search query terms, at least partially based on the relevant topic, to increase a likelihood of customer satisfaction of the current user with a user experience within the customer support system, by reducing a likelihood of inaccurately identifying the relevant topic for the search query terms received by the customer support system.

In accordance with an embodiment, a system identifies a relevant topic for search query terms based on context characteristics for the search query terms, to provide customer support responses to the search query terms based on the relevant topic for the search query terms. The system includes a customer support engine that receives search query terms data and context characteristics data for a customer support system hosted by one or more computing systems, the search query terms data representing one or more search query terms, according to one embodiment. The context characteristics data represent one or more context characteristics, according to one embodiment. The context characteristics data are selected from a group of context characteristics data, consisting of: data representing user characteristics of a current user; data representing identification of user experience displays visited by the current user, the user experience displays being provided by one or more service provider systems associated with the customer support system; and data representing identification of the one or more service provider systems associated with the customer support system and used by the current user, according to one embodiment. The system includes an analytics module that identifies one of a plurality of topics as being a relevant topic for the one or more search query terms, at least partially based on the search query terms data and at least partially based on the context characteristics data, according to one embodiment. The analytics module identifies one of the plurality of topics as being the relevant topic by applying the search query terms data and the context characteristics data to a probabilistic topic model that generates topic relevance scores data representing a plurality of topic relevance scores for the plurality of topics, according to one embodiment. The analytics module identifies the relevant topic from the plurality of topics by selecting a highest one of the plurality of topic relevance scores for the plurality of topics, according to one embodiment. The customer support engine provides a customer support response that is responsive to receipt of the search query terms data, at least partially based on the relevant topic, to provide the customer support response at least partially based on the context characteristics data to reduce a likelihood of inaccurately identifying the relevant topic and to increase a likelihood of correctly addressing the search query terms with the customer support response, according to one embodiment.

In accordance with an embodiment, a system improves a likelihood of user satisfaction with a customer support response that is provided by a customer support system in response to receiving search query terms, by using context information to reduce a likelihood of inaccurately identifying a relevant topic for the search query terms with a probabilistic topic model. The system includes at least one processor and at least one memory coupled to the at least one processor, according to one embodiment. The at least one memory stores instructions which, when executed by any set of the one or more processors, perform a process for using context information to reduce a likelihood of inaccurately identifying a relevant topic for the search query terms with a probabilistic topic model, according to one embodiment. The process includes receiving search query terms data representing one or more search query terms received by a customer support system with one or more computing systems, from a current user, according to one embodiment. The process includes applying the search query terms data to a probabilistic topic model to identify topics data representing one or more topics that are relevant to the one or more search query terms, and to determine topic relevance scores data for the topics data representing the one or more topics, the topic relevance scores data representing one or more topic relevance scores that quantify a likelihood of relevance between the one or more topics and the one or more search query terms received from the current user, according to one embodiment. The process includes generating length data for the search query terms data, the length data for the search query terms data representing a combined length of the one or more search query terms, according to one embodiment. The process includes comparing the length data for the search query terms data to search query length threshold data representing a search query length threshold, below which a likelihood of inaccuracy increases for the probabilistic topic model, according to one embodiment. The process includes, if the combined length of the one or more search query terms is less than the search query length threshold, updating the topic relevance scores data representing the one or more topic relevance scores with context characteristics probabilities data to reduce the likelihood of inaccuracy for the probabilistic topic model, the context characteristics probabilities data representing one or more context characteristics probabilities that quantify a likelihood that a question about the one or more topics occurs while one or more context characteristics for the search query terms exist, according to one embodiment. Updating the topic relevance scores data includes identifying context characteristics data representing the context characteristics for the search query terms, according to one embodiment. The context characteristics data are selected from a group of context characteristics data consisting of data representing user characteristics of the current user; data representing identification of user experience displays visited by the current user, the user experience displays being provided by one or more service provider systems associated with the customer support system; and data representing identification of the one or more service provider systems associated with the customer support system and used by the current user, according to one embodiment. Updating the topic relevance scores data includes applying the context characteristics data to the probabilistic topic model to generate the context characteristics probabilities data representing the one or more context characteristics probabilities, according to one embodiment. Updating the topic relevance scores data includes combining the context characteristics probabilities data with the topic relevance scores data to update the topic relevance scores data to reflect a combination of the context characteristics probabilities data and the topic relevance scores data, according to one embodiment. The process includes selecting a relevant topic from the one or more topics that is likely most relevant to the one or more search query terms, at least partially based on a highest one of the one or more topic relevance scores represented by the topic relevance scores data, according to one embodiment. The process includes providing a personalized customer support response to the current user for the search query terms, at least partially based on the relevant topic, to increase a likelihood of customer satisfaction of the current user with a user experience within the customer support system, by reducing a likelihood of inaccurately identifying the relevant topic for the search query terms received by the customer support system.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for improving a likelihood of user satisfaction with a customer support response that is provided by a customer support system in response to receiving search query terms, by using context information to reduce a likelihood of inaccurately identifying a relevant topic for the search query terms with a probabilistic topic model, the method comprising:

receiving search query terms data representing one or more search query terms received by a customer support system with one or more computing systems, from a current user;

applying the search query terms data to a probabilistic topic model to identify topics data representing one or more topics that are relevant to the one or more search query terms, and to determine topic relevance scores data for the topics data representing the one or more topics, the topic relevance scores data representing one or more topic relevance scores that quantify a likelihood of relevance between the one or more topics and the one or more search query terms received from the current user;

generating length data for the search query terms data, the length data for the search query terms data representing a combined length of the one or more search query terms;

comparing the length data for the search query terms data to search query length threshold data representing a search query length threshold, below which a likelihood of inaccuracy increases for the probabilistic topic model;

upon determining that the combined length of the one or more search query terms is less than the search query length threshold, updating the topic relevance scores data representing the one or more topic relevance scores with context characteristics probabilities data to reduce the likelihood of inaccuracy for the probabilistic topic model, the context characteristics probabilities data representing one or more context characteristics probabilities that quantify a likelihood that a question about the one or more topics occurs while one or more context characteristics for the search query terms exist, wherein updating the topic relevance scores data includes: identifying context characteristics data representing the context characteristics for the search query terms, the context characteristics data at least including data representing identification of user experience displays visited by the current user, the user experience displays being provided by one or more service provider systems associated with the customer support system;

training the probabilistic topic model using a Latent Dirichlet algorithm, wherein training the probabilistic topic model includes:

retrieving existing customer support content data;

applying the Latent Dirichlet algorithm to existing customer support content data representing existing customer support content, to generate a predetermined number of topics, to generate a plurality of topic terms that are relevant to each of the predetermined number of topics, and to generate a plurality of topic term probabilities associated with the plurality of topic terms; and storing predetermined number of topics data representing the predetermined number of topics, plurality of topic terms data representing the plurality of topic terms, and plurality of topic term probabilities data representing the plurality of topic term probabilities, in a topics data structure for the customer support system;

applying the context characteristics data to the probabilistic topic model to generate the context characteristics probabilities data representing the one or more context characteristics probabilities; and combining the context characteristics probabilities data with the topic relevance scores data to update the topic relevance scores data to reflect a combination of the context characteristics probabilities data and the topic relevance scores data; selecting a relevant topic from the one or more topics that is likely most relevant to the one or more search query terms, at least partially based on a highest one of the one or more topic relevance scores represented by the topic relevance scores data; and providing a personalized customer support response to the current user for the search query terms, at least partially based on the relevant topic, to increase a likelihood of customer satisfaction of the current user with a user experience within the customer support system, by reducing a likelihood of inaccurately identifying the relevant topic for the search query terms received by the customer support system.

2. The method of claim 1, wherein the length of the one or more search query terms is one of a character length and a word length.

3. The method of claim 1, wherein the probabilistic topic model includes a Latent Dirichlet algorithm.

4. The method of claim 1, wherein the topics data structure for the customer support system is part of the probabilistic topic model.

5. The method of claim 1, wherein applying the search query terms data to the probabilistic topic model to identify the topics data representing the one or more topics that are relevant to the one or more search query terms, and to determine topic relevance scores data for the topics data representing the one or more topics, includes:

searching the topics data structure to identify ones of the plurality of topic terms that match at least some of the one or more search query terms; and for each of the predetermined number of topics, calculating a sum of ones of the plurality of topic term probabilities associated with the ones of the plurality of topic terms that match at least some of the one or more search query terms, wherein for each of the predetermined number of topics, the sum of the ones of the topic term probabilities is a topic relevance score for the each of the predetermined number of topics.

6. The method of claim 1, wherein identifying the context characteristics data representing the context characteristics for the search query terms, includes at least one of:

retrieving the data representing the user characteristics from existing user characteristics data stored by the customer support system or stored by the one or more service provider systems associated with the customer support system;

receiving the data representing the user characteristics from the current user through a user experience display of the customer support system;

receiving the data representing identification of user experience displays visited by the current user from browsing history for the current user maintained by the one or more service provider systems associated with the customer support system;

identifying the data representing identification of user experience displays visited by the current user by monitoring the browsing history of the current user within the customer support system; and receiving the data representing identification of the one or more service provider systems from the one or more service provider systems associated with the customer support system.

7. The method of claim 1, wherein the data representing user characteristics are selected from a group of data representing user characteristics, consisting of:

data indicating an age of the current user;
data indicating an age of a spouse of the current user;
data indicating a zip code;
data indicating a tax return filing status;
data indicating state income;
data indicating a home ownership status;
data indicating a home rental status;
data indicating a retirement status;
data indicating a student status;
data indicating an occupation of the current user;
data indicating an occupation of a spouse of the current user;
data indicating whether the user is claimed as a dependent;
data indicating whether a spouse of the user is claimed as a dependent;
data indicating whether another taxpayer is capable of claiming the user as a dependent;
data indicating whether a spouse of the current user is capable of being claimed as a dependent;
data indicating salary and wages;
data indicating taxable interest income;
data indicating ordinary dividend income;
data indicating qualified dividend income;
data indicating business income;
data indicating farm income;
data indicating capital gains income;
data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction; and
data indicating whether the user is a returning user to a tax return preparation system.

8. The method of claim 1, wherein the personalized customer support response includes suggested user actions selected from a group of suggested user actions, consisting of:

select a hyperlink or button to receive a telephone call from customer support personnel;

select a hyperlink or button to initiate a webchat with the customer support personnel;

select a hyperlink or button to access reference materials and/or a topic index for the relevant topic;

select a hyperlink or button to receive a telephone number to dial to reach the customer support personnel; and select a hyperlink or button to receive information related to available services from a service provider.

9. A system for identifying a relevant topic for search query terms based on context characteristics for the search query terms, to provide customer support responses to the search query terms based on the relevant topic for the search query terms, the system comprising:

a customer support engine that receives search query terms data and context characteristics data for a customer support system hosted by one or more computing systems, the search query terms data representing one or more search query terms, the context characteristics data representing one or more context characteristics, wherein the context characteristics data at least including data representing identification of user experience displays visited by the current user, the user experience displays being provided by one or more service provider systems associated with the customer support system;

an analytics module that identifies one of a plurality of topics as being a relevant topic for the one or more search query terms, at least partially based on the search query terms data and at least partially based on the context characteristics data, wherein the analytics module identifies one of the plurality of topics as being the relevant topic by applying the search query terms data and the context characteristics data to a probabilistic topic model that generates topic relevance scores data representing a plurality of topic relevance scores for the plurality of topics, wherein the analytics module identifies the relevant topic from the plurality of topics by selecting a highest one of the plurality of topic relevance scores for the plurality of topics, wherein the analytics module trains the probabilistic topic model using a Latent Dirichlet algorithm, wherein the analytics module trains the probabilistic topic model with an application of existing customer support content data to a Latent Dirichlet algorithm to generate a predetermined number of topics used to identify the relevant topic, and to generate a plurality of topic term probabilities used to generate the plurality of topic relevance scores;

wherein the customer support engine provides a customer support response that is responsive to receipt of the search query terms data, at least partially based on the relevant topic, to provide the customer support response at least partially based on the context characteristics data to reduce a likelihood of inaccurately identifying the relevant topic and to increase a likelihood of correctly addressing the search query terms with the customer support response.

10. The system of claim 9, wherein the probabilistic topic model includes a Latent Dirichlet algorithm.

11. The system of claim 9, wherein the customer support response includes suggested user actions selected from a group of suggested user actions, consisting of:

select a hyperlink or button to receive a telephone call from customer support personnel;

select a hyperlink or button to initiate a webchat with the customer support personnel;

select a hyperlink or button to access reference materials and/or a topic index for the relevant topic;

select a hyperlink or button to receive a telephone number to dial to reach the customer support personnel; and select a hyperlink or button to receive information related to available services from a service provider.

12. A system for improving a likelihood of user satisfaction with a customer support response that is provided by a customer support system in response to receiving search query terms, by using context information to reduce a likelihood of inaccurately identifying a relevant topic for the search query terms with a probabilistic topic model, the system comprising:

at least one processor; and at least one memory coupled to the at least one processor, the at least one memory having stored therein instructions which, when executed by the at least one processors, perform a process including:

training the probabilistic topic model using a Latent Dirichlet algorithm, wherein training the probabilistic topic model includes:

retrieving existing customer support content data;

applying the Latent Dirichlet algorithm to existing customer support content data representing existing customer support content, to generate a predetermined number of topics, to generate a plurality of topic terms that are relevant to each of the predetermined number of topics, and to generate a plurality of topic term probabilities associated with the plurality of topic terms; and storing predetermined number of topics data representing the predetermined number of topics, plurality of topic terms data representing the plurality of topic terms, and plurality of topic term probabilities data representing the plurality of topic term probabilities, in a topics data structure for the customer support system;

receiving search query terms data representing one or more search query terms received by a customer support system with one or more computing systems, from a current user;

applying the search query terms data to a probabilistic topic model to identify topics data representing one or more topics that are relevant to the one or more search query terms, and to determine topic relevance scores data for the topics data representing the one or more topics, the topic relevance scores data representing one or more topic relevance scores that quantify a likelihood of relevance between the one or more topics and the one or more search query terms received from the current user;

generating length data for the search query terms data, the length data for the search query terms data representing a combined length of the one or more search query terms;

comparing the length data for the search query terms data to search query length threshold data representing a search query length threshold, below which a likelihood of inaccuracy increases for the probabilistic topic model;

upon determining that the combined length of the one or more search query terms is less than the search query length threshold, updating the topic relevance scores data representing the one or more topic relevance scores with context characteristics probabilities data to reduce the likelihood of inaccuracy for the probabilistic topic model, the context characteristics probabilities data representing one or more context characteristics probabilities that quantify a likelihood that a question about the one or more topics occurs while one or more context characteristics for the search query terms exist, wherein updating the topic relevance scores data includes: identifying context characteristics data representing the context characteristics for the search query terms, the context characteristics data at least including data representing identification of user experience displays visited by the current user, the user experience displays being provided by one or more service provider systems associated with the customer support system;

applying the context characteristics data to the probabilistic topic model to generate the context characteristics probabilities data representing the one or more context characteristics probabilities; and combining the context characteristics probabilities data with the topic relevance scores data to update the topic relevance scores data to reflect a combination of the context characteristics probabilities data and the topic relevance scores data;

selecting a relevant topic from the one or more topics that is likely most relevant to the one or more search query terms, at least partially based on a highest one of the one or more topic relevance scores represented by the topic relevance scores data; and providing a personalized customer support response to the current user for the search query terms, at least partially based on the relevant topic, to increase a likelihood of customer satisfaction of the current user with a user experience within the customer support system, by reducing a likelihood of inaccurately identifying the relevant topic for the search query terms received by the customer support system.

13. The system of claim 12, wherein the length of the one or more search query terms is one of a character length and a word length.

14. The system of claim 12, wherein the probabilistic topic model includes a Latent Dirichlet algorithm.

15. The method of claim 12, wherein applying the search query terms data to the probabilistic topic model to identify the topics data representing the one or more topics that are relevant to the one or more search query terms, and to determine topic relevance scores data for the topics data representing the one or more topics, includes:

searching the topics data structure to identify ones of the plurality of topic terms that match at least some of the one or more search query terms; and for each of the predetermined number of topics, calculating a sum of ones of the plurality of topic term probabilities associated with the ones of the plurality of topic terms that match at least some of the one or more search query terms, wherein for each of the predetermined number of topics, the sum of the ones of the topic term probabilities is a topic relevance score for the each of the predetermined number of topics.

16. The system of claim 12, wherein identifying the context characteristics data representing the context characteristics for the search query terms, includes at least one of:

retrieving the data representing the user characteristics from existing user characteristics data stored by the customer support system or stored by the one or more service provider systems associated with the customer support system;

receiving the data representing the user characteristics from the current user through a user experience display of the customer support system;

receiving the data representing identification of user experience displays visited by the current user from browsing history for the current user maintained by the one or more service provider systems associated with the customer support system;

identifying the data representing identification of user experience displays visited by the current user by monitoring the browsing history of the current user within the customer support system; and receiving the data representing identification of the one or more service provider systems from the one or more service provider systems associated with the customer support system.

17. The system of claim 12, wherein the data representing user characteristics are selected from a group of data representing user characteristics, consisting of:

data indicating an age of the current user;
data indicating an age of a spouse of the current user;
data indicating a zip code;
data indicating a tax return filing status;
data indicating state income;
data indicating a home ownership status;
data indicating a home rental status;
data indicating a retirement status;
data indicating a student status;
data indicating an occupation of the current user;
data indicating an occupation of a spouse of the current user;
data indicating whether the user is claimed as a dependent;
data indicating whether a spouse of the user is claimed as a dependent;
data indicating whether another taxpayer is capable of claiming the user as a dependent;
data indicating whether a spouse of the current user is capable of being claimed as a dependent;
data indicating salary and wages;
data indicating taxable interest income;
data indicating ordinary dividend income;
data indicating qualified dividend income;
data indicating business income;
data indicating farm income;
data indicating capital gains income;
data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction; and
data indicating whether the user is a returning user to a tax return preparation system.

18. The system of claim 12, wherein the personalized customer support response includes suggested user actions selected from a group of suggested user actions, consisting of:

select a hyperlink or button to receive a telephone call from customer support personnel;

select a hyperlink or button to initiate a webchat with the customer support personnel;
select a hyperlink or button to access reference materials and/or a topic index for the relevant topic;
select a hyperlink or button to receive a telephone number to dial to reach the customer support personnel; and
select a hyperlink or button to receive information related to available services from a service provider.

\* \* \* \* \*